US010922817B2

(12) United States Patent
Natroshvili

(10) Patent No.: US 10,922,817 B2
(45) Date of Patent: Feb. 16, 2021

(54) PERCEPTION DEVICE FOR OBSTACLE DETECTION AND TRACKING AND A PERCEPTION METHOD FOR OBSTACLE DETECTION AND TRACKING

(71) Applicant: Intel Corporation, Santa Clara, CA (US)

(72) Inventor: Koba Natroshvili, Waldbronn (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/285,253

(22) Filed: Feb. 26, 2019

(65) Prior Publication Data

US 2019/0188862 A1   Jun. 20, 2019

Related U.S. Application Data

(63) Continuation-in-part of application No. 16/145,315, filed on Sep. 28, 2018.

(51) Int. Cl.
*G06T 7/20* (2017.01)
*G06K 9/00* (2006.01)
(Continued)

(52) U.S. Cl.
CPC ............... *G06T 7/20* (2013.01); *G01S 17/50* (2013.01); *G01S 17/931* (2020.01);
(Continued)

(58) Field of Classification Search
CPC ... G06T 7/20; G06T 7/50; G06T 2207/10044; G06T 2207/20084; G06T 2207/20076; G06T 2207/10028; G06T 2207/10016; G06T 7/277; G01S 17/931; G01S 17/51; G06K 9/00805; G06K 9/6267; G06K 9/6261; G06K 9/623; G06K 9/6289;
(Continued)

(56) References Cited

U.S. PATENT DOCUMENTS

2014/0139375 A1   5/2014 Faragher et al.
2016/0116916 A1   4/2016 Pink et al.
(Continued)

OTHER PUBLICATIONS

Office Action issued in the U.S. Appl. No. 16/145,315 dated Nov. 27, 2020, 13 pages.

*Primary Examiner* — Marcos L Torres
(74) *Attorney, Agent, or Firm* — Viering, Jentschura & Partner MBB

(57) ABSTRACT

A perception device, including at least one image sensor configured to detect a plurality of images; an information estimator configured to estimate from each image of the plurality of images a depth estimate, a velocity estimate, an object classification estimate and an odometry estimate; a particle generator configured to generate a plurality of particles, wherein each particle of the plurality of particles comprises a position value determined from the depth estimate, a velocity value determined from the velocity estimate and a classification value determined from the classification estimate; an occupancy hypothesis determiner configured to determine an occupancy hypothesis of a predetermined region, wherein each particle of the plurality of particles contributes to the determination of the occupancy hypothesis.

19 Claims, 19 Drawing Sheets

(51) Int. Cl.
*G06T 7/50* (2017.01)
*G06K 9/62* (2006.01)
*G01S 17/50* (2006.01)
*G01S 17/931* (2020.01)

(52) U.S. Cl.
CPC ......... *G06K 9/00805* (2013.01); *G06K 9/623* (2013.01); *G06K 9/6261* (2013.01); *G06K 9/6267* (2013.01); *G06K 9/6289* (2013.01); *G06T 7/50* (2017.01); *G06T 2207/10028* (2013.01); *G06T 2207/10044* (2013.01); *G06T 2207/20076* (2013.01); *G06T 2207/20084* (2013.01); *G06T 2207/30261* (2013.01)

(58) Field of Classification Search
CPC .... G06K 9/6271; G06N 3/084; G06N 3/0454; G06N 3/0445
See application file for complete search history.

(56) References Cited

U.S. PATENT DOCUMENTS

| | | | |
|---|---|---|---|
| 2017/0006263 A1 | 1/2017 | Sron | |
| 2018/0232947 A1* | 8/2018 | Nehmadi | G06T 3/4007 |
| 2018/0345958 A1* | 12/2018 | Lo | G05D 1/0088 |
| 2019/0311205 A1* | 10/2019 | Mittal | G01C 21/32 |

* cited by examiner

PERCEPTION DEVICE FOR OBSTACLE DETECTION AND TRACKING AND A PERCEPTION METHOD FOR OBSTACLE DETECTION AND TRACKING

CROSS-REFERENCE TO RELATED APPLICATION

This application is a continuation-in-part of U.S. patent application Ser. No. 16/145,315, filed on Sep. 28, 2018, the entire contents of which is hereby incorporated herein by reference.

TECHNICAL FIELD

Various aspects of this disclosure relate generally to a perception device for obstacle detection and tracking and a perception method for obstacle detection and tracking.

BACKGROUND

Perception and sensor fusion are essential processes of fully or partially Automatic Driving vehicles since they provide up to date knowledge of the area surrounding the vehicles. Ultimately, high perception quality is a precondition for both the safety of the passengers as well as for other people on the street.

Initial approaches to address the perception problem were based on detecting and tracking objects using bounding boxes; but the bounding box approach fails to detect large objects, such as buildings for which no bounding box can be constructed. In addition, bounding boxes fail to support information fusion from multiple sensors, such as camera, lidar, radar, in a coherent bounding box. Finally, the bounding box approach is computationally very expensive.

Alternatives to bounding boxes include particle filters in conjunction with dynamic occupancy grids (DOG): dynamic occupancy grids provide a way to model the space around the vehicles wherein sensor measurements are transformed into particles that are placed on the DOG and then abstracted to recognize free space static obstacles and dynamic, i.e. moving, objects. As a result, DOGS provide a natural and effective solution to the sensor fusion problem and an effective way to represent simultaneously static and dynamic objects independently of their size. Particle filters provide a way to evolve dynamic occupancy grids to adapt to the changing road conditions and to prune particles that may be derived from faulty sensor readings.

Nevertheless, dynamic occupancy grids also present problems, in particular with images detected from image sensors, such as monocameras. First, monocamera images do not transmit a depth dimension, therefore it is difficult to transform them into particles to be used in a DOG; second, images from monocameras, as well as from other sensor such as lidar sensors, miss velocity information; therefore it is impossible to distinguish moving objects from static and dynamic objects, and to predict how to grid will evolve with time; third, images from the monocamera miss object identification information and therefore it is difficult to recognize which parts of the image needs to be transformed into particles and which one should be discarded.

SUMMARY

A perception device, including at least one image sensor configured to detect a plurality of images; an information estimator configured to estimate from each image of the plurality of images a depth estimate, a velocity estimate, an object classification estimate and an odometry estimate; a particle generator configured to generate a plurality of particles, wherein each particle of the plurality of particles comprises a position value determined from the depth estimate, a velocity value determined from the velocity estimate and a classification value determined from the classification estimate; an occupancy hypothesis determiner configured to determine an occupancy hypothesis of a predetermined region, wherein each particle of the plurality of particles contributes to the determination of the occupancy hypothesis.

BRIEF DESCRIPTION OF THE DRAWINGS

In the drawings, like reference characters generally refer to the same parts throughout the different views. The drawings are not necessarily to scale; emphasis is instead generally being placed upon illustrating the principles of the disclosure. In the following description, various embodiments of the disclosure are described with reference to the following drawings, in which.

DESCRIPTION

The following detailed description refers to the accompanying drawings that show, by way of illustration, specific details and embodiments in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

Whereas the description, the examples, and the figures below refer to an Automatic Driving (AD) (e.g. Autonomous Driving) vehicle, it should be understood that examples of Automatic Driving vehicles may include automobiles, buses, mini buses, vans, trucks, mobile homes, vehicle trailers, motorcycles, bicycles, tricycles, moving robots, personal transporters, and drones. It should also be understood that Automatic Driving vehicles may include trains, trams, subways and more generally vehicles that are limited to move on pre-specified tracks; it should also be understood the perception device disclosed applies to vehicles of any size and type.

In addition, it should be understood that the perception device disclosed, as well as the examples disclosed, are not restricted to vehicles; rather, the perception device may be used in a wide range of applications including security cameras that may use the perception device to monitor access to a given area; traffic lights that may use the perception device to monitor the traffic waiting at an intersection; smart digital signage for both advertisement and information purposes that may use perception device to estimate the number of impressions or to derive the most relevant content to display; traffic congestion sensors that may use the perception device to estimate the traffic in a given area; speedometers that may use the perception device to compute the speed of vehicles in a given area.

Figure 1:
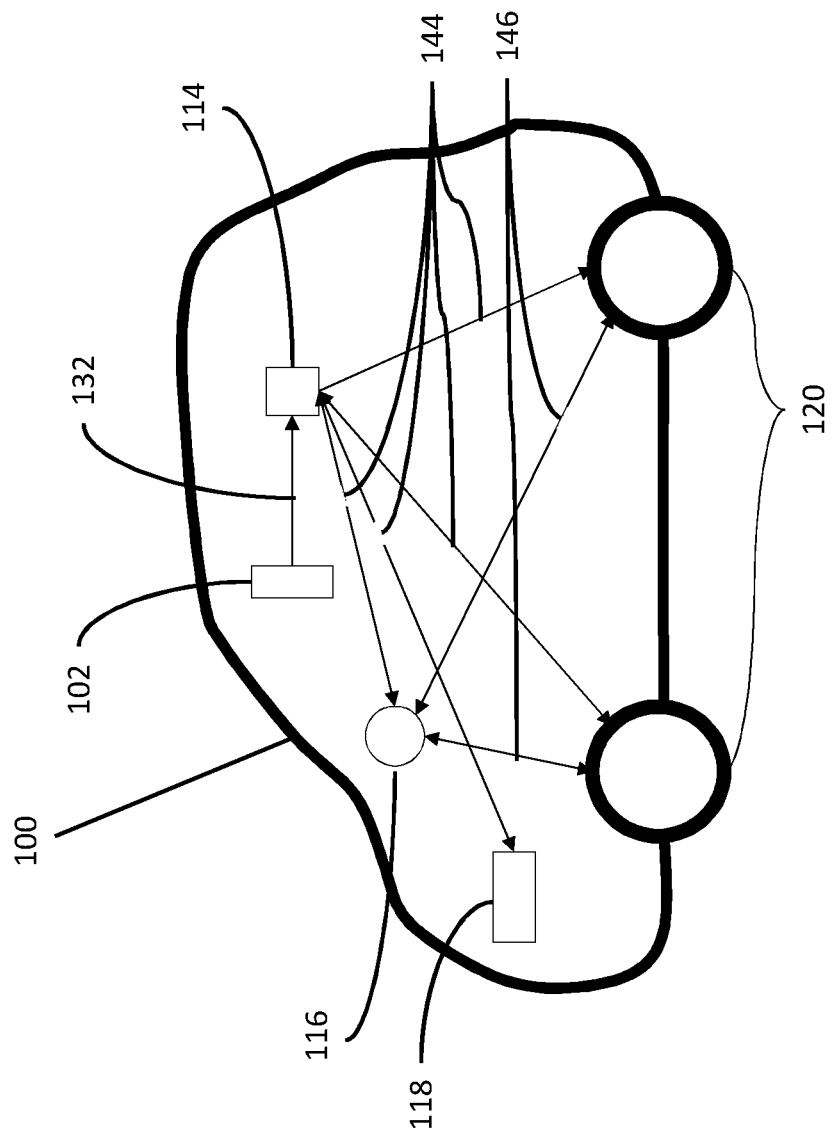
FIG. 1 shows an exemplary vehicle including a perception device to detect space occupation in a predetermined region.

FIG. 1 shows an exemplary vehicle (e.g. an automatic vehicle) 100 including a perception device 102 to detect space occupation in a predetermined region 100. In some embodiments, examples of space occupation may include static and dynamic objects, wherein exemplary static objects may correspond to obstacles on the road, and exemplary dynamic objects may correspond to other vehicles and traffic.

The exemplary automatic driving vehicle 100 may also include an automotive controller 114 as well as various automotive components such as a steering module 116, a motor 118, and wheels 120 which may also include a braking system and a turning system neither of which are displayed.

In some embodiments, the perception device 102 may be a stand-alone device that may not be connected with other components. In such cases, the perception device 102 may signal to the user of potential dangers.

In other embodiments, the perception device 102 may be connected to automotive controller 114 of the exemplary vehicle 100 through the exemplary connection 132. The automotive controller 114 may be configured to control the vehicle driving direction and velocity, and in general to control the automotive components such as the steering module 116, the motor 118, and the wheels 120, the braking system, not displayed in FIG. 1, and other systems that are included in the vehicle.

The automotive controller 114 may be configured to fully or partially control vehicle 100. Full control may indicate that the automotive controller 114 may be configured to control the behavior of all other automotive components. Partial control may indicate that the automotive controller 114 may be configured to control only some automotive components, but not others which are under the control of a human driver. In some exemplary embodiments of partial control, the automotive controller 114 may be configured to control only the vehicle speed, but not the steering. In some embodiments of vehicle 100, partial control may indicate that the automotive controller 114 may be configured to control all automotive components, but only in some situations, for example, control the vehicle on the highway but not on other roads where a human driver should take control. In other embodiments, partial control may indicate any combination of the embodiments above.

In some embodiments, the perception device 102 may be connected to the automotive controller through the connector 132. In these embodiments the connector 132 may be configured to transfer occupation information from the perception device 102 to the automotive controller 114. In some embodiments, occupation information may be in the form of an occupancy grid. In some embodiments, the complete dynamic occupation grid may be transferred, in other embodiments only parts of the occupancy grid may be transferred. In some embodiments, the connector 132 between the perception device 102 and the automotive controller 114 may be configured on the bases of a request/response protocol, whereby the automotive controller 114 may request information to the perception device, and the perception device may respond with information such as occupation information.

In the exemplary embodiment of vehicle 100 displayed in FIG. 1, the perception device 102, and the automotive controller 114 are distinct components. In other embodiments of vehicle 100, the perception device, 102, and the automotive controller 114 may be integrated into a single device. In other embodiments the perception device 102, and the automotive controller 114 may be partially integrated. In such embodiments, some of the components of the perception device 102 may be integrated within the automotive controller 114.

FIG. 1 also shows an exemplary connection scheme across the different components. The connectors 144 may couple the automotive controller 114 with the steering module 116, the motor 118, and the wheels 120, and the like. The connectors 144 may be configured in such a way that the automotive controller 114 may indicate to the steering module 116, the motor 118, and the wheels 120 how to drive the vehicle, and the steering module 116, the motor 118, and the wheels 120 may indicate odometric information, positioning information and vehicle status information back to the steering module 116.

The connectors 146 couple the steering module 116 to a turning system (not shown) of the wheels 120 to control the driving direction of the vehicle. The connectors 146 may be configured in such a way that the steering module 116 may indicate to the actuating components, such as the turning system (not shown) of the wheels 120 how to drive the vehicle, and the actuating components, such as turning system (not shown) of the wheels 120 may indicate odometrical information, positioning information and vehicle status information back to the steering module 114.

The connectors 132, 144 and 146 may be implemented as a wired connection or a wireless connection. Any kind of communication protocol including vehicle bus networks such as Controller Area Network (CAN), Local Interconnected Network (LIN) bus, FlexRay, Media Oriented System Transport (MOST), and Automotive Ethernet, as well as cryptographic and non-cryptographic variations, may be used for a communication between two respective components. Furthermore, the interaction between the components may be implemented as cyclic broadcast or multicast communication or a remote function call or an API call across software modules or in any other way that allows transfer of information between components.

In the exemplary embodiment displayed in FIG. 1, vehicle 100 may be an automobile, and possibly an automatic driving automobile, but in other embodiments, vehicle 100 may be an automatic driving vehicle 100 e.g. an autonomous driving vehicle, an autonomous drone, an autonomous plane or any other flying object, an autonomous bike, trike, or the like. The autonomous vehicle 100 may also be any kind of robot or moving hardware agent. Furthermore, it may be to be noted that the vehicle 100 does not necessarily need to be a fully autonomous vehicle, but can also be a partially autonomous vehicle or a vehicle in which implements the perception device as part of the driver assistance systems.

In some embodiments, the vehicle 100 may be replaced with any device requiring perception in a given area, such as surveillance devices which may monitor a specific location. As opposed to vehicles that constantly change position, such a device may be fixed in a specific position.

Figure 2:
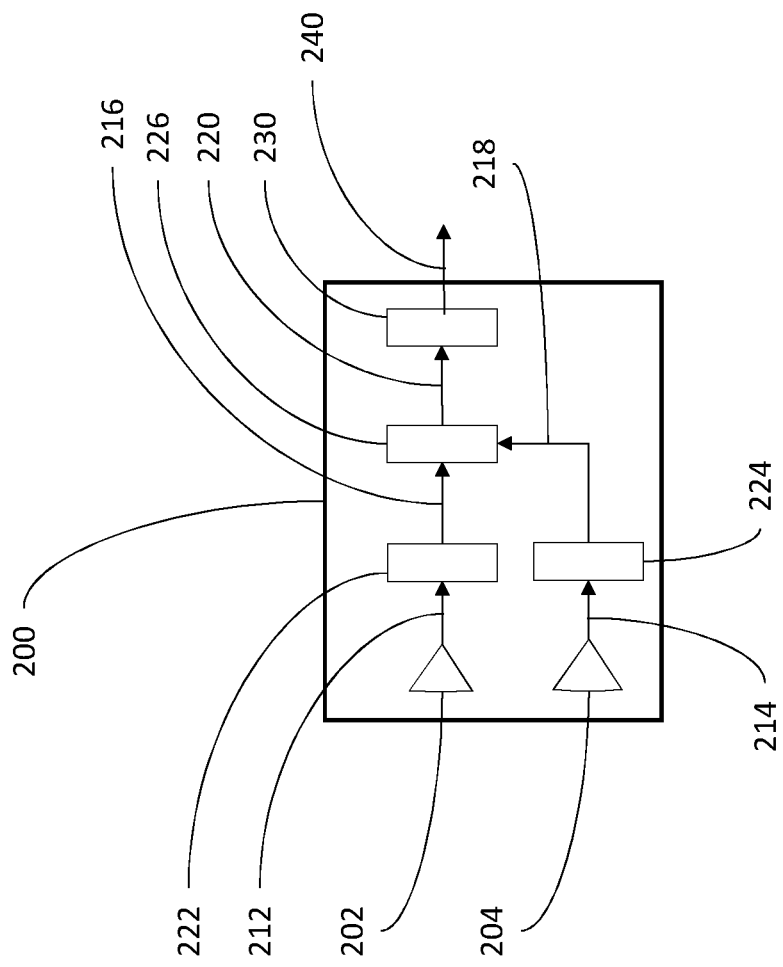
FIG. 2 shows an exemplary perception device that may accomplish the task of determining an occupancy hypothesis of a predetermined region.

FIG. 2 shows an exemplary perception device 200 may accomplish the task of determining an occupancy hypothesis of a predetermined region. The perception device 200 may be functionally equivalent to perception device 102.

To accomplish the task, a perception device may include a plurality of sensors, e.g. 202 and 204 and potentially others not shown, wherein the at least one sensor, for example sensor 202, may be an image sensor, such as a mono-camera, configured to detect a plurality of images. In some embodiments, the plurality of images may be detected at regular time intervals. Sensor 204 may also be an image sensor, but it may also be a different type of sensors such as a lidar sensor, or a radar sensor.

In some embodiments, the limitations of the sensors range may determine the region of the occupancy hypothesis determined by the perception device 200. In other embodiments, the determination of the region of the occupancy hypothesis may be performed in a different way.

In some embodiments, sensors, such as image sensor 202, may be rigidly attached to the vehicle 100 pointing in the direction of motion of vehicle 100. In some embodiments, sensors, such as image sensor 202, may be at an angle with respect to the direction of motion. In some embodiments, sensors, such as image sensor 202, may move dynamically as the vehicle 100 moves.

In some embodiments, an image sensor, such as image sensor 202, may be intrinsically and extrinsically calibrated. In some embodiments, the calibration of image sensors, such as image sensor 202, may involve calibration tests with respect to a colored checkerboard. In some embodiments, the other sensors 204 may also be calibrated.

The plurality of sensors, such as the exemplary sensors, e.g. sensors 202 and 204, may be connected to a plurality of information estimators, e.g. 222 and 224, which may be configured to decode the sensory information to derive valuable information which could be used to determine occupation information useful to control vehicle 100.

The connectors between the sensors and the information estimators, such as the exemplary connectors 212 and 214, may transmit sensory information from the sensors to the information estimators. As a way of example, the exemplary connector 212 may transmit a plurality of images detected by the image sensor 202, while the exemplary connector 214 may instead transmit other types of information that depend on the sensor 204 such as laser or radar readings.

The information estimator 222 may be configured to estimate from each image of the plurality of images transmitted through connector 214, at least one depth estimate, at least one velocity estimate, at least one object classification estimate and at least one odometry estimate;

In an analogous way, the information estimator 224 may be configured to estimate information from sensor readings collected by sensor 204. In some embodiments, information estimators may estimate different information. For example, whereas the information estimator 222 may provide at least one velocity estimate, the estimator 224 may not provide any velocity estimate, or it may estimate a radial velocity.

In some embodiments, each sensor may be associated with an information estimator; in other embodiments all sensors of the same type may be associated with one information estimator that can process the sensory information that they produce. In some exemplary embodiments, information estimator 222 may process information from a plurality of image sensors such as 212. In other embodiments, other configurations may be possible wherein an information processor may serve some but not all sensors of a given type.

The estimates from the information estimators may be transferred through connectors such as 216 and 218 to an exemplary particle generator, such as 226.

A particle generator, such as particle generator 226, may be configured to synthesize the readings received from all sensors. To accomplish this task, the particle generator 226 may be configured to generates a plurality of particles, wherein each particle of the plurality of particles may comprise a position value determined from an exemplary depth estimate, a velocity value determined from an exemplary velocity estimate and a classification value determined from an exemplary classification estimate. Each particle may also contain an indication of which sensor generated the information represented by the particle. In some embodiments, particles may contain also additional values, beyond position, velocity and classification.

In some embodiments, each particle may correspond to a sensor reading; therefore, the whole set of particles may represent the collection of all readings collected by all sensors. In other embodiments, some particles may represent multiple sensors readings.

The plurality of particles generated by the particle generator 226 may be transmitted through connector 220 to an occupancy hypothesis determiner, such as the exemplary occupancy hypothesis determiner 230.

The occupancy hypothesis determiner 230 may be configured to determine an occupancy hypothesis of the predetermined region wherein each particle of the plurality of particles provides some evidence that a given position may be occupied. Therefore, each particle of the plurality of particles contributes to the determination of the occupancy hypothesis. Furthermore, through the relation with particles, each sensor reading contributes to the determination of the occupancy hypothesis.

An occupancy hypothesis may be thought as a dynamic map of the predetermined region which may depend on the distribution of particles, wherein the more particles are associated with a given location in the predetermined region, the higher is the likelihood that the location is occupied.

Illustratively the perception devices 200 has been represented in FIG. 2 as a single box, but in some embodiments of vehicle 100, the sensors, such as 202 and 204, the information estimators 222 and 224, the particle generator 226, and the single occupancy hypothesis determiner 230, may be distributed across the whole vehicle to accommodate engineering considerations or other considerations. In some embodiments, some of the components 202, 204, 222, 224, 226 and 230 may also be included in an automotive controller such as the exemplary automotive controller 114.

The connectors 212, 214, 216, 318, 230 may be implemented analogously to connectors 132, 144, 146 in FIG. 1 as wired or wireless connections. Any kind of communication protocol including vehicle bus networks such as Controller Area Network (CAN), Local Interconnected Network (LIN) bus, FlexRay, Media Oriented System Transport (MOST), and Automotive Ethernet, as well as cryptographic and non-cryptographic variations, may be used for a communication between two respective components. Furthermore, the interaction between the components may be implemented as cyclic broadcast or multicast communication or a remote function call or an API call across software modules or in any other way that allows transfer of information between components.

The connector 240 may be functionally equivalent to connector 132 and it may be configured to transfer occupation information from the perception device 222 to an automotive controller, functionally equivalent to automotive controller 114.

Figure 3:
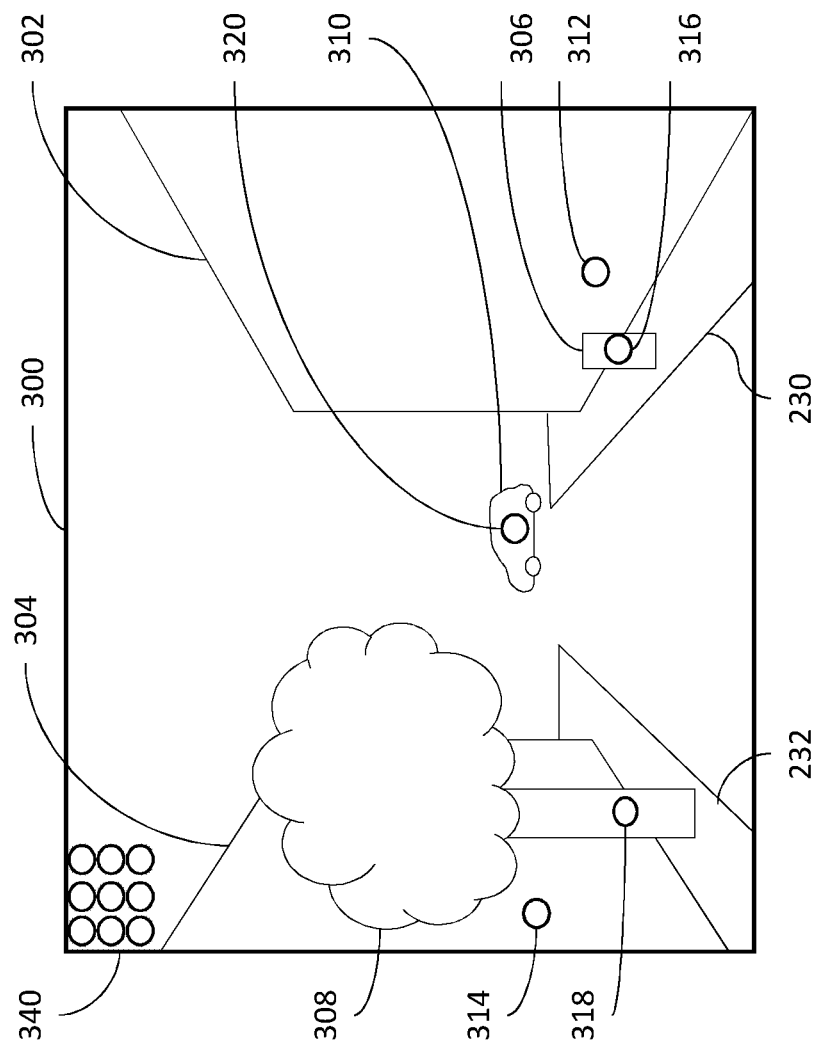
FIG. 3 shows a sample image that may be detected by an image sensor.

FIG. 3 shows a sample image 300 that may be detected by an image sensor that may be functionally equivalent to the exemplary image sensor 202. Image 300 may represent an urban scene with a first wall 302, a second wall 304, a tree 308 in front of the second wall 304, a first sidewalk 330, a second sidewalk 332, an object 306 on the first sidewalk and a vehicle 310.

Image 300, as well every image may comprise a plurality of pixels, wherein each pixel of the plurality of pixels may be characterized by three values; wherein the first value of the three values specify the green luminosity level of the pixel, the second value of the three values specify the red luminosity level of the pixel, the third value of the three values specify the yellow luminosity level of the pixel.

The sample Image 300 may also include a sample of a plurality of pixels represented by the round shapes 312, 314, 316, 318, 320. Each pixel may represent a portion of the image 300, and, more specifically, each pixel may represent a portion of an object represented in the image. As a way of example, the pixel 312 may represent a portion of the first wall 302, the pixel 314 may represent a portion of the second wall 304, the pixel 316 may represent a portion of the object 306, the pixel 318 may represent a portion of the tree 308 and the pixel 320 may represent a portion of the vehicle 310.

In some embodiments, the plurality of pixels in an image such as image 300 may be organized in a 2-dimensional (2D) matrix in a way similar to the pixels represented in the shaded area 340.

Each pixel in image 300 may also provide information about the objects that the image represents. An exemplary information estimator, which may be functionally equivalent to the information estimator 222, may estimate from at least one pixel of the plurality of pixels in image 300 one or more distance estimates, one or more velocity estimates, one or more object classification estimates. As a way of example, the exemplary information estimator 222 may estimate from pixel 320 the position of vehicle 310, the velocity of vehicle 310, and the classification of vehicle 310, e.g. that it is a car. In addition, the information extractor may extract one or more odometric estimates of the image sensor motion.

As a way of example, an exemplary particle generator, which may be functionally equivalent to particle generator 226 may generate a particle corresponding to each one of pixels 312, 314, 316, 318, 320. One of, these particles may be derived from pixel 320 may contribute to identifying vehicle 310.

Finally, as a way of example an exemplary occupancy hypothesis determiner that may be functionally equivalent to the occupancy hypothesis determiner may determine that a given area in front of the image sensor that detected image 300 is occupied and that the object occupying the area may be of labeled as a car.

Figure 4:
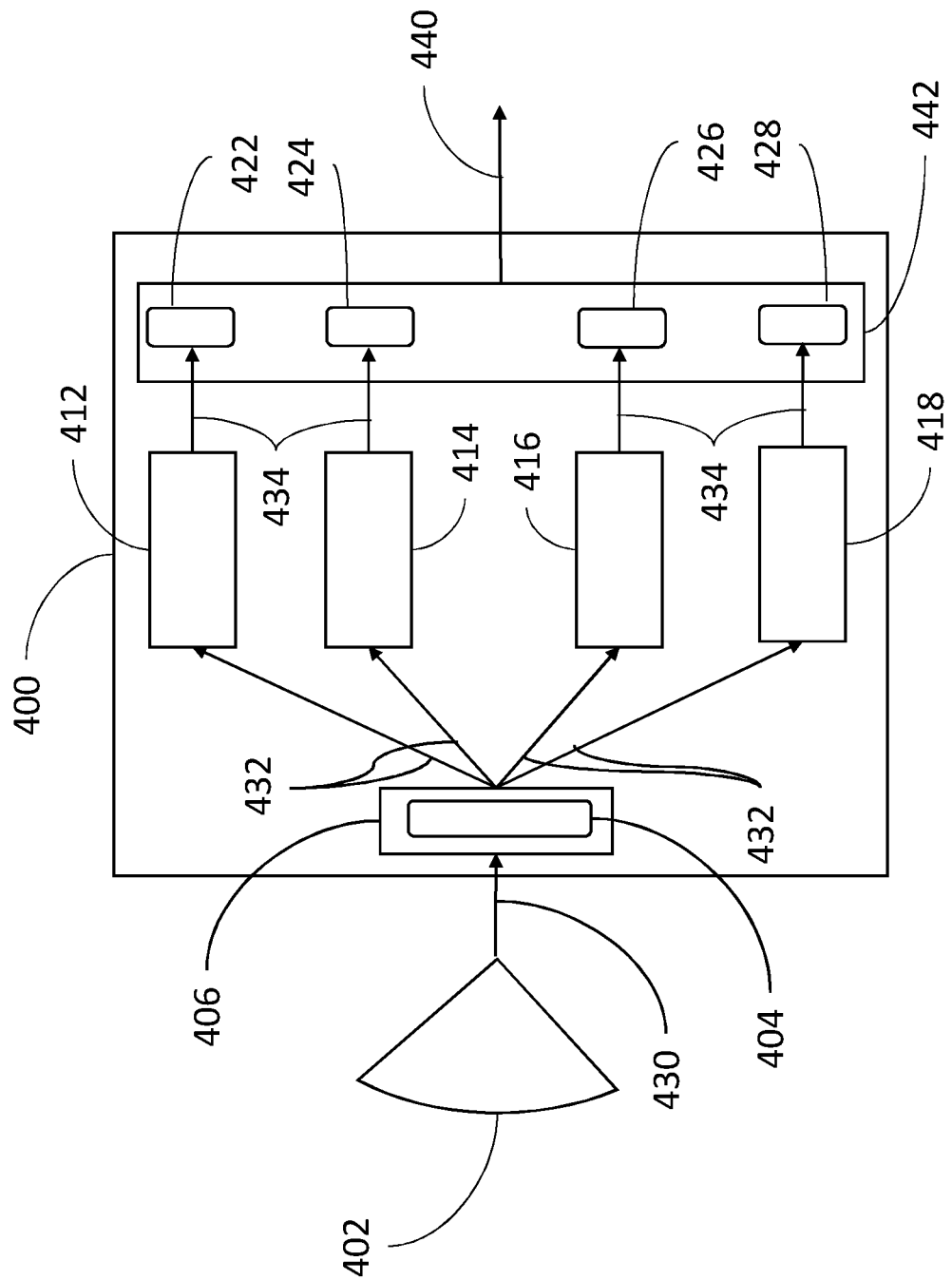
FIG. 4 shows an embodiment of an information estimator.

FIG. 4 shows an embodiment of an information estimator 400 that may be functionally equivalent to the information estimator 222. The information estimator 400 estimates special information from images such as image 404, which may be equivalent to image 300, detected by the image sensor 402, which may be functionally equivalent to the image sensor 202.

Information estimator 400 may receive images such as image 404 from image sensor 402 through connector 430, which may be functionally equivalent to connector 212. An input component 406 in the information estimator 400 may receive the images transferred from the image sensor 402 through connector 430 and then distribute these images to the estimators 412. 414, 416, 418 through connectors 432.

In some embodiments input component 406 may store the plurality of images; in some embodiments, the input component may perform a pre-processing of the images.

Estimator 412 is a depth estimator estimating the depth of objects depicted in images such as image 404 to produce one or a plurality of depth estimates 422, wherein depth estimates 422 may be estimates of the distance between image sensor 402 and objects, or portions of objects, depicted in image 404. In other words, depth estimator 412 may estimate the distance between image sensor 402 and the objects that surround image sensor 402 and that are also depicted in image 404. In some embodiments, each distance estimate may be a single value; in other embodiments, a distance estimate may indicate a distance value and an angle with respect to some reference direction such as the vehicle direction.

Estimator 414 may be a velocity estimator estimating at least one velocity estimates 424, wherein velocity estimates may be estimates of the velocity of the depicted objects relative to the image sensor. In other words, velocity estimator 424 may estimate whether the objects depicted in image 404 relative to image sensor 402. In some embodiments, a velocity estimate may be a single value; in other embodiments, a velocity value estimate may be defined in term of a speed value and a direction of motion with respect to some reference coordinate system that may be centered in the image sensor 402.

Estimator 416 may be a classification estimator estimating at least one classification estimates 426, wherein classification estimates may be estimates of the classification of objects depicted in image 404. In other words, classification estimator 416 may estimate or recognize whether an object depicted in the image 404 is a vehicle, or a building or any other type of object. In some embodiments, the types in the classification may include labels such as road, sidewalk, building, wall, fence, pole, traffic light, traffic sign, vegetation, terrain, sky, person, rider, car, truck, bus, train, motorcycle, and bicycle.

Estimator 418 may be an odometry estimator estimating at least one odometry estimates 428, wherein odometry estimates may be estimates of the movements of the image sensor 402. The odometry estimate may estimate how fast image sensor 402 is moving, and its direction of movement and acceleration.

In some embodiments estimates produced by estimators 412, 414, 416, 418 with respect to the image sensor may be interpreted as estimates with respect to the vehicle that may be hosting the image sensor. In these embodiments, the information estimator may estimate distances with respect to the vehicle, velocities with respect to the vehicle and odometry estimates with respect to the movements of the vehicle.

In some embodiments, the information estimator may contain additional estimators. Such estimators may include multiple instances of the estimators described above, or they may include multiple instances of other types of estimators that provide additional information about the objects that may surround vehicle 100.

The output component 442 may collect all the outputs of the estimators, such as depth estimate 422, velocity estimate 424, classification estimate 426 and odometry estimate 428. In some embodiments, output component 442 may perform some post processing of the estimated values.

Output component 442 may transfer the estimates through connector 440 to other components. Such other components may include particle generators that may be functionally equivalent to particle generator 226, in such case connector 440 may be functionally equivalent to connector 216.

As a result, information estimator 400 from each input image of a plurality of images may estimate at least depth estimate where the depth estimate may an estimate of the distance from a portion of an object depicted in the input image to the image sensor; at least one velocity estimate that may be an estimate of the velocity of the portion of an object depicted in the input image with respect to the image sensor; at least one object classification that may be one or more labels representing a classification of the portion of an object depicted in the input image with respect to a predefined set of labels; and an the odometry estimate that may be a measure of the movements of the image sensor.

Figure 5:
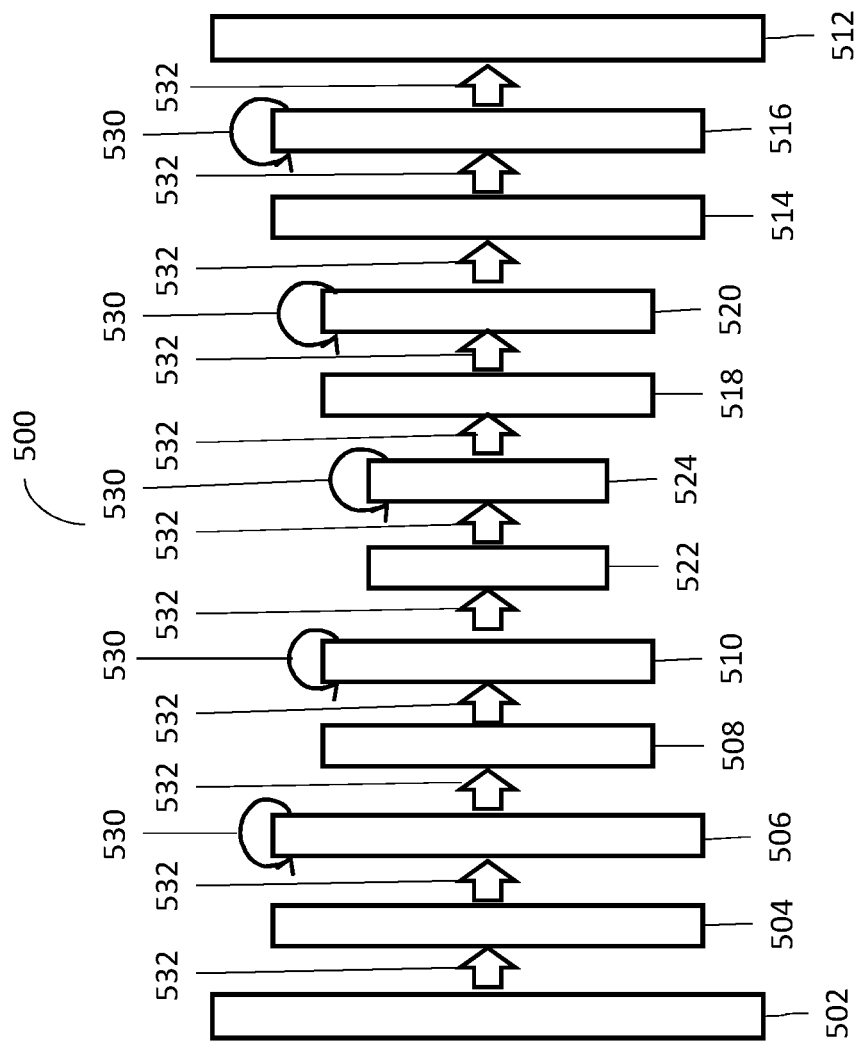
FIG. 5 shows an embodiment of the image estimator as a neural network.

FIG. 5 shows an embodiment of an estimator as a neural network, the estimator may be functionally equivalent to information any one of the estimators 412, 414, 416, and 418, as an exemplary neural network 500. The neural network 500 may include an input layer 502 that may be configured to store the input image, such as image 404 or image 300, and the output layer 512 that may be configured to store the estimates computed by the estimator. Exemplarily, the output layer 512 may correspond to any one of the estimate 422, 424, 426, 428. The neural network 500 may also contain one or a plurality of inner layers.

Each layer 502, 504, 506, 508, 510, 512, 514, 516, 518, 520, 522, 524 may be composed of network portions, in other words units, wherein illustratively a unit may correspond to a neuron in the neural network. The network portions, in other words the units, may be connected to each other across layers and within the layers. The connections may be characterized by a weight that may indicate the strength of the connection between two network portions. Connections weights may indicate how related two network portions, in other words two units are. Changing the connections weights may affect the overall behavior of the neural network. Connections weights may be changed, in other words adjusted, during the training of the neural network. In some embodiments, the training of the neural network is a process that may aim at adjusting the connection weights so that the overall network implements a specific input/output transformation. In some embodiments, the method to train a neural network is backpropagation.

Input layer 502 may be composed of units in a neural network, wherein illustratively a unit may correspond to a neuron in the network. Input layer 502 may encode an input image, such as image 404 or image 300, by encoding the pixels in the image in units in the input layer; in such a way that each unit may represent only one pixel, and one pixel may be represented by one unit.

The neural network 500 may also include one or a plurality of convolution layers, such has exemplary layers 504, 506, 508, 510, 522; and one or a plurality of deconvolution layers, such as exemplary layers 518, 520, 514, 516, 524. Convolution layers may define an encoding stage of Neural Network 500, while deconvolution layers may define a decoding stage Neural Network 500. In some embodiments, deconvolution may be performed using depth-to-space layers.

In some embodiments, some of the layers may be configured as recurrent convolution layers, where at least one of the units included in the recurrent layers may be configured as Long Short-Term Memory (LSTM) unit. In some embodiments, all units of the recurrent layers are configured as LSTM units. Exemplary layers 506, 510, 524, 520, 516 may be recurrent layers as indicated by the signs 530.

The connectors 532 represent cross layers' connections in the exemplary neural network 500. In some embodiments, the layers of the network may be fully connected, in other embodiments different forms of partial connectivity may be adopted.

In some embodiments, in which neural network 500 may comprise a plurality of hidden layers, it may be functionally equivalent to a deep neural network (DNN). In some embodiments, in which neural network 500 may include recurrent layers, it may be functionally equivalent to a deep recurrent network (DRNN). In some embodiments, in which the network may include both recurrent and convolution layers, it may be functionally equivalent to a recurrent convolution neural network (CRNN).

Figure 6:
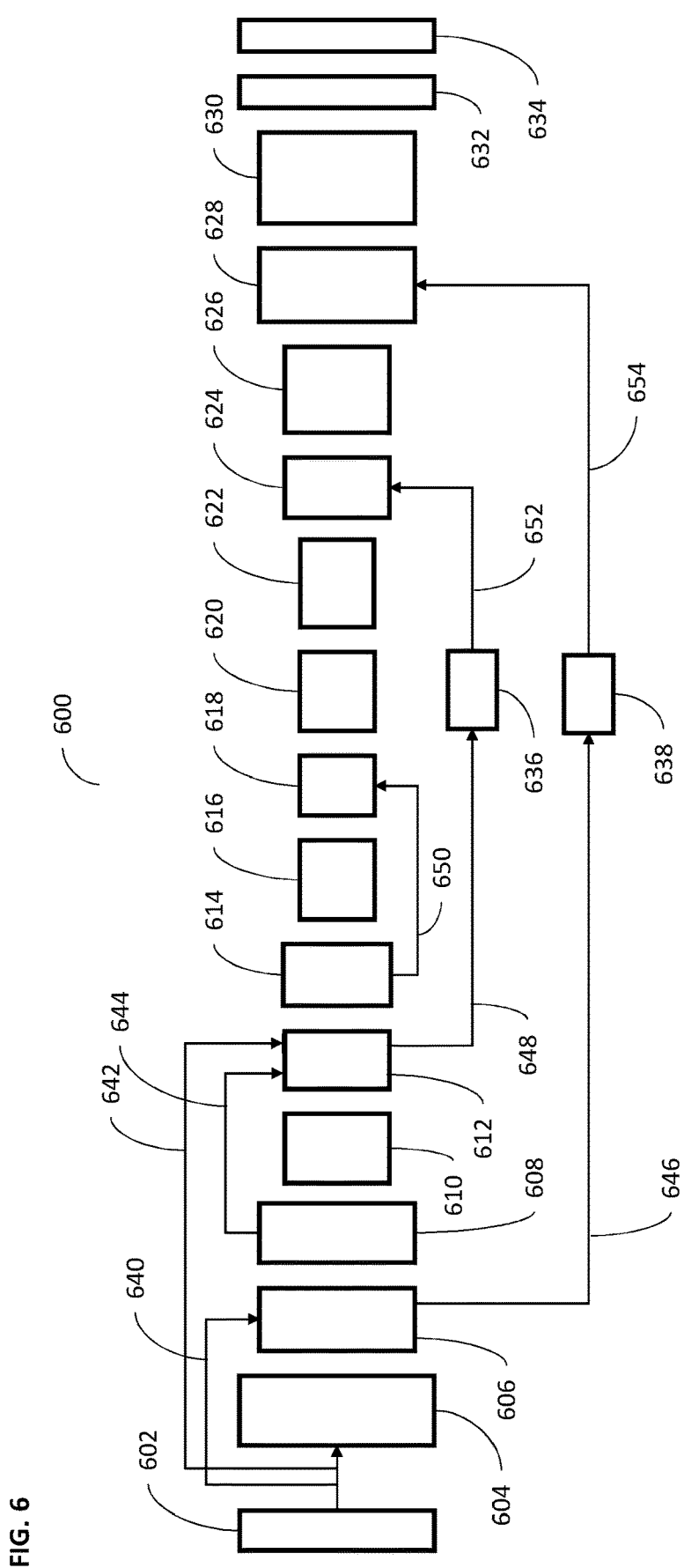
FIG. 6 represents an embodiment of a classification estimator configured as a deep neural network.

FIG. 6 shows an embodiment of a classification estimator, such as classification estimator 416, configured as a deep neural network (DNN) 600. Neural network 600 may be based on the exemplary neural network 500, with additional details that allow the network to recognize the classification of objects in the images.

The input layer 602 encodes an image and it may be functionally equivalent to layer 502. The inner layers of the network are described in Table 1 wherein the Reference column may indicate the reference number of a sign in FIG. 6 representing the layer. The Layer column may indicate a layer with respect to DNN 600. As a way of example, the reference number 610 may indicate a sign in FIG. 6 corresponding to 2 layers 610-3 and 610-4. The Type column may indicate the type of layer, wherein the label Convolution may indicate that the corresponding layer may be a convolution layer; the label Deconvolution may indicate that the corresponding layer may be a deconvolution layer; the label ESP may indicate that the corresponding layer may be configured as an Efficient Spatial Pyramid (ESP) module that may be functionally equivalent to 700; and the label Softmax may indicate that the Softmax function may be applied to the corresponding layer. The column I/O Channels describes the number of input/output channels. The column Scaling at output provides a parameter determining the scaling of the output. The Inputs column shows the corresponding layer's inputs, wherein the sign & may indicate the concatenation operator.

TABLE 1

Description of the layers of DNN in FIG. 6

| Reference | Layer | Type | I/O Channels | Scaling at output | Inputs |
|---|---|---|---|---|---|
| 604 | 604 | Convolution | 3/32 | 2 | 602 |
| 608 | 608-1 | ESP | 32/64 | 4 | 602 & 604 |
| 610 | 610-2 | ESP | 64/64 | 4 | 608-1 |
| 610 | 610-3 | ESP | 64/64 | 4 | 610-2 |
| 614 | 614-4 | ESP | 64/128 | 8 | 602 & 604 & 610-3 |
| 616 | 616-5 | ESP | 128/128 | 8 | 614 |
| 620 | 620 | Convolution | 256/19 | 8 | 614 & 616-1 |
| 622 | 622 | Deconvolution | 19/19 | 4 | 620 |
| 636 | 636 | Convolution | 131/19 | 4 | 602 & 604 & 610-3 |
| 624 | 624 | ESP | 38/38 | 4 | 622 & 636 |
| 626 | 626 | Deconvolution | 38/19 | 2 | 624 |
| 638 | 638 | Convolution | 35/19 | 2 | 602 & 604 |
| 628 | 628 | Convolution | 38/19 | 2 | 626 & 638 |
| 630 | 630 | Deconvolution | 19/19 | 1 | 628 |
| 632 | 632 | Softmax | 19/1 | 1 | 630 |

The additional layers 606, 612 and 618 are concatenation layers required to merge information from different connections.

The layers in neural network 600 may be fully connected or partially connected, furthermore the connections 640, 642, 644 and 650 allow the computation performed within some layers to be transferred forward allowing the natural implementation of an identity function by skipping some layers in the connection. As a consequence, the neural network may learn and to compute more complex functions. A similar effect may be achieved with connections 646, 648. 652, and 654.

The output layer 634 may indicate the estimated classification of the objects detected in the image encoded in layer 602 and the probability of such encoding.

Figure 7:
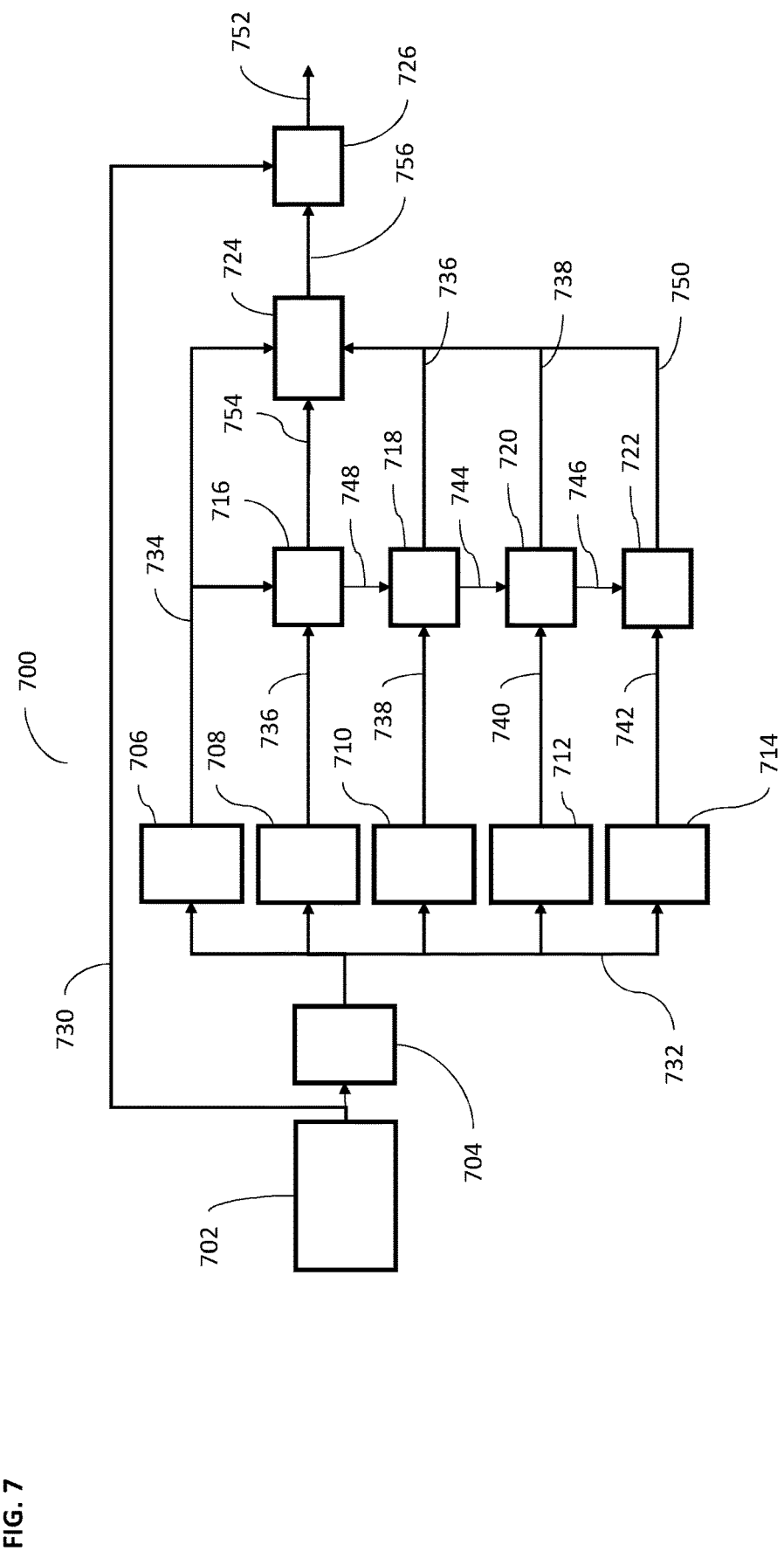
FIG. 7 shows an embodiment of an exemplary ESP layer.

The training of network 600 may be performed using backpropagation starting from a predefined set of images and a corresponding set of encodings of the expected output classifications; the loss function may be defined as the difference between the classification probabilities computed by DNN 600 and the expected outputs FIG. 7 shows an embodiment of an exemplary ESP layer. ESPs are a type of convolutional modules that are efficient in terms of computation, memory, and power while maintaining a similar accuracy of classification.

The input layer 702 may be composed of M input channels, wherein M may be a parameter of the ESP and it may depend on the convolution layers to which input layer 702 may be connected to. The data in the input layer 702 may be transferred through connector 730 to both the convolution layer 704 and the output layer 726. Convolution layer 704 may perform a first convolution and then it may transfer, through connectors 732, its results to the convolution layers 706, 708, 710 712, and 714. Convolution layers 704, 706, 708, 710 712, and 714 are described in details in Table 2, wherein the Layer column may indicate the reference number of a layer. As a way of example, 704 in the first raw may indicate the layer 704 in FIG. 7. The Type column may indicate the type of layer, wherein the label Convolution may indicate that the corresponding layer may be a convolution layer. The column I/O Channels describes the number of input/output channels. The column Dilation may be the dilation parameter that may describe the size of filters adopted in the convolution layer.

In column I/O Channels, the value d may be determined on the bases of the following equation:

$$d = M/K \quad (1)$$

Wherein

M may be the number of input channels of layer 702;

K may be a parameter of the ESP which in some embodiments may be set to 5.

TABLE 2

Layers of the ESP network

| Layer | Type | I/O Channels | Kernel size | Dilation |
|---|---|---|---|---|
| 704 | Convolution | M/d | 1 × 1 | 1 |
| 706 | Convolution | d/d | 3 × 3 | 1 |
| 708 | Convolution | d/d | 3 × 3 | 2 |
| 710 | Convolution | d/d | 3 × 3 | 4 |
| 712 | Convolution | d/d | 3 × 3 | 8 |
| 714 | Convolution | d/d | 3 × 3 | 16 |

The layers 716, 718, 720, 722 may be summation layers that implement the ESP characteristic feature of progressively summing the results of the convolution layers. Therefore, the values of the convolution of layer 706, and the values of the convolution layer 708 may be transferred through connections 734 and 736 respectively to layer 716 which may be a summation layer. In turns, the values of the summation layer 716 and the values of convolution layer 710 may be further transmitted to summation layer 718 through connectors 748 and 738 respectively. Similarly, the values of the summation layer 718 and the values of convolution layer 712 may be further transmitted to summation layer 720 through connectors 744 and 740 respectively. Finally, the values of the summation layer 720 and the values of convolution layer 714 may be further transmitted to summation layer 722 through connectors 742 and 746 respectively.

Layer 724 may be a concatenation layer that may concatenate the results of the convolution layer 706, that may be transmitted through connector 734, with the results of the summation layers 716, 718, 720 722 that may be transmitted through connectors 754, 736, 738, 750 respectively.

Layer 726 may be a summation layer that may sum the input values from the input layer 702 transmitted through connector 730 with the values with the concatenated values in layer 724 transmitted through connector 756.

Connector 752 may transmit the values of the EPS convolutions to a further layer in the neural network.

Figure 8:
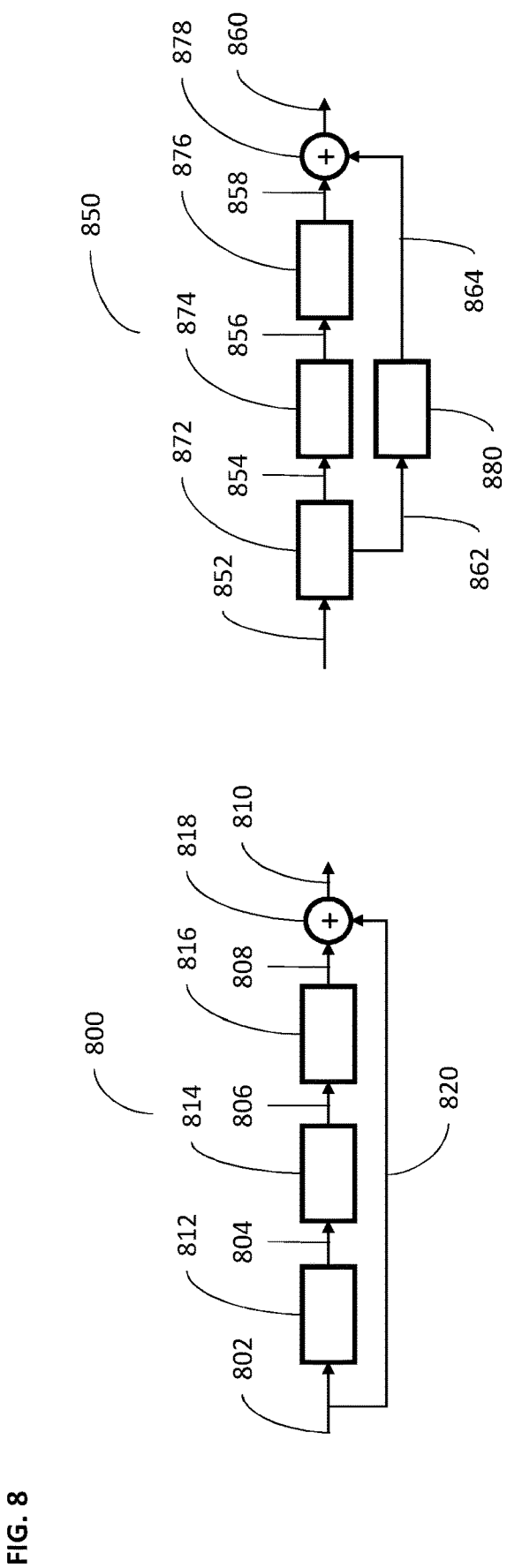
FIG. 8 shows an exemplary embodiment of a residual blocks module and an exemplary embodiment of an up-project module.

FIG. 8 shows an exemplary embodiment of a residual blocks module 800 and an exemplary embodiment of an up-project module 850. Residual block modules and up-project modules may have the function of increasing the depth of a neural network and therefore of increasing the number of functions that a neural network may be able to compute, while reducing the training effort of the neural network.

Residual blocks, such as exemplary residual block 800, may be a form of convolution module that allows the identity to be a form of convolution function.

In the exemplary residual network module 800, connector 802 provides the input data. Such input data may be directly transferred to the output layer 818 through connector 820, and it may be further transferred to layer 812 which may be a convolution layer with exemplary parameters 1×1. Convolution layer 812 may be connected to a layer 814 through connector 804. Layer 814 may be a convolution layer with exemplary parameters 3×3 and it may be further connected to layer 816 through connector 806. Layer 816 may be a convolution layer with exemplary parameters 1×1. Convolution layer 816 may be further connected through connection 808 to summation layer 818 which compute a sum of the result of the convolutions computed by layers 812, 814, and 816, with the data provided by connector 820. Connector 810 may connect the output layer 818 of the residual block module 800 to other modules in the neural network.

Up-project modules, such as the exemplary up-project module 850 may be a form of deconvolution layers. In the exemplary up-project module 850, connector 852 provides the input data to an exemplary deconvolution layer 872 with exemplary parameters 5×5. Layer 872 may be connected to layer 874 through connector 854. Layer 874 may be a convolution layer with exemplary parameters 5×5 and it may be further connected to layer 876 through connector 856. Layer 876 may be a convolution layer with exemplary parameters 3×3. Convolution layer 876 may be connected through connection 858 to a summation layer 878.

Deconvolution layer 872 may be further connected to layer 880 through connector 862. Layer 880 may be a convolution layer with exemplary parameters 5×5 and it may be further connected to a summation layer 818 through connector 864.

Summation layer 878 may compute a sum of the result of the deconvolution and convolutions computed by layers 872, 874, and 876 with the convolution computed by layer 880. Connector 860 may connect the summation layer 878 of the up-project module 850 to other modules in the neural network.

Figure 9:
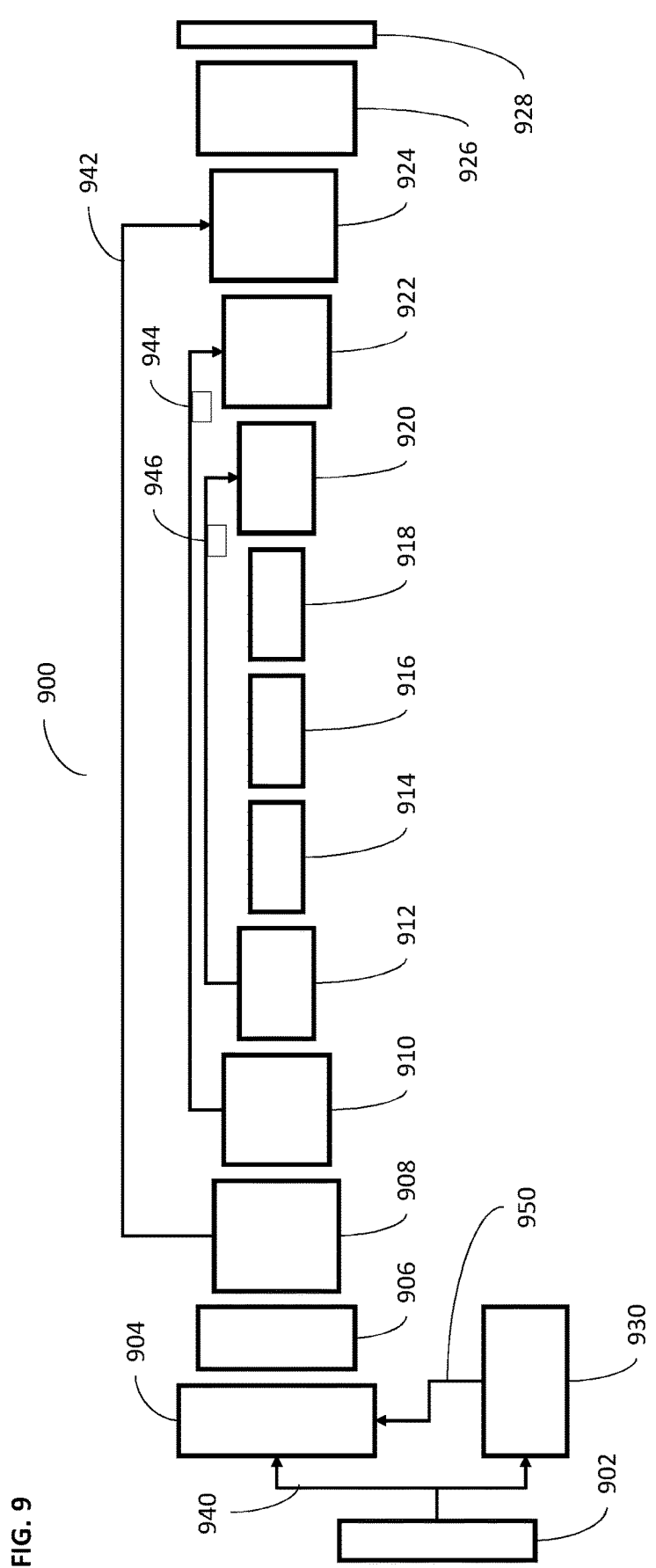
FIG. 9 shows an embodiment of a depth estimator configured as a deep neural network.

FIG. 9 shows an embodiment of a depth estimator, such as depth estimator 412, configured as a deep neural network (DNN) 900. Neural network 900 may be based on the exemplary neural network 500, with additional details that allow the network to recognize the depth of the objects in the images.

The input layer 902 encodes an image and it may be functionally equivalent to layer 502.

The inner layers of the network are described in Table 3 wherein the columns of Table 3 have the same interpretation as in Table 1, and the Type column may indicate the type of layer, wherein the label Convolution may indicate that the corresponding layer may be a convolution layer; the label Max Pooling may indicate that the corresponding layer may be a max pooling layer; the label Residual Block may indicate that the corresponding layer may be a residual block layer, which may be functionally equivalent to the residual block module 800; the label Up-project may indicate that the corresponding layer may be an up-project layer which may be functionally equivalent to the up-project module 850; and the label Deconvolution may indicate that the corresponding layer may be a deconvolution layer.

As a way of example, each one of the layers 908-1, 908-2, 908-3, 908-4, indicated by the sign with reference number 908 in the third row of Table 3, may be a residual block layers with a number of input/output channels that may either be 32/128 in case of layer 908-1, or 128/128, as in the case of layers 908-2 and 908-3, or 128/256 as in the case of layer 908-4; furthermore, layers 908-1, 908-2, 908-3 may have a "scaling at" output value of 4 while layer 908-4 may have a "scaling at" output value of 8.

TABLE 3

Description of the layers of the DNN in FIG. 9

| Reference | Layer | Type | I/O Channels | Scaling at output | Inputs |
|---|---|---|---|---|---|
| 904 | 904 | Convolution | 3/32 | 2 | 902 |
| 906 | 906 | Max Pool | 32/32 | 4 | 904 |
| 908 | 908-1 | Res Block | 32/128 | 4 | 906 |
| 908 | 908-2 | Res Block | 128/128 | 4 | 908-1 |
| 908 | 908-3 | Res Block | 128/128 | 4 | 908-2 |
| 908 | 908-4 | Res Block | 128/256 | 8 | 908-3 |
| 910 | 910-5 | Res Block | 256/256 | 8 | 908-4 |
| 910 | 910-6 | Res Block | 256/256 | 8 | 910-5 |
| 910 | 910-7 | Res Block | 256/256 | 8 | 910-6 |
| 910 | 910-8 | Res Block | 256/512 | 16 | 910-7 |
| 912 | 912-9 | Res Block | 512/512 | 16 | 910-8 |
| 912 | 912-10 | Res Block | 512/512 | 16 | 912-9 |
| 912 | 912-11 | Res Block | 512/512 | 16 | 912-10 |
| 912 | 912-12 | Res Block | 512/512 | 16 | 912-11 |
| 912 | 912-13 | Res Block | 512/512 | 16 | 912-12 |
| 912 | 912-14 | Res Block | 512/1024 | 32 | 912-13 |
| 914 | 914-15 | Res Block | 1024/1024 | 32 | 912-14 |
| 914 | 914-16 | Res Block | 1024/1024 | 32 | 914-15 |
| 916 | 916 | Convolution | 1024/512 | 32 | 914-16 |
| 918 | 918 | Up-project | 512/256 | 16 | 916 |
| 920 | 920 | Up-project | 256/128 | 8 | 918 & 912-13 |
| 922 | 922 | Up-project | 128/64 | 4 | 920 &910-7 |
| 924 | 924 | Up-project | 64/32 | 2 | 922 &908-3 |
| 926 | 926 | Deconvolution | 32/1 | 1 | 924 |

The input layer 902 may be connected to layer 904 through connector 940.

Layers in neural network 900 may be fully or partially connected, wherein layer 904 may be connected to layer 906, which may be further connected to layers 908, which may be further connected to layers 910, which may be further connected to layers 912, which may be further connected to layers 914, which may be further connected to layer 916, which may be further connected to layer 918, which may be further connected to layer 920, which may be further connected to layer 922, which may be further connected to layer 924, which may be further connected to layer 926, which may be further connected to output layer 928, In some embodiments, neural network 900 may also contain additional connections. In such embodiments, at least one of the layers referenced by 908 may be further connected to layer 924 through connector 924; at least one of the layers referenced by 910 may be connected to layer 922 through connector 944; and at least one of the layers referred by 912 may be connected to layer 920 through connector 946.

Layer 928 may be an output layer that may provide the depth of the different objects in the image. In some embodiments, Layer 928 may have the same number of units of layer 902 wherein for each portion of the input image the depth value may be estimated.

In some embodiments, the output of a classification estimator 930, which may be a neural network functionally equivalent to neural network 600 or another type of estimator functionally equivalent to estimator 416, may provide an additional input to convolution layer 904.

The training of neural network 900 may require a loss function to evaluate the estimate error. In some embodiments, the loss function of the depth estimator may be configured to compute a function of the differences between the distance estimates computed by the neural network 900 and a plurality of reference values which provide a ground truth on the distance between the image sensor and the objects displayed in a test image.

In some embodiments, the loss function of the distance estimator may be configured to compute the following formula:

$$\Sigma \|D_i - D_{DT_i}\| \quad (2)$$

wherein $D_i$ may be the one distance estimate;

$D_{GT_i}$ may be the one depth reference value;

$\|\ldots\|$ may indicate the absolute value function.

Figure 10:
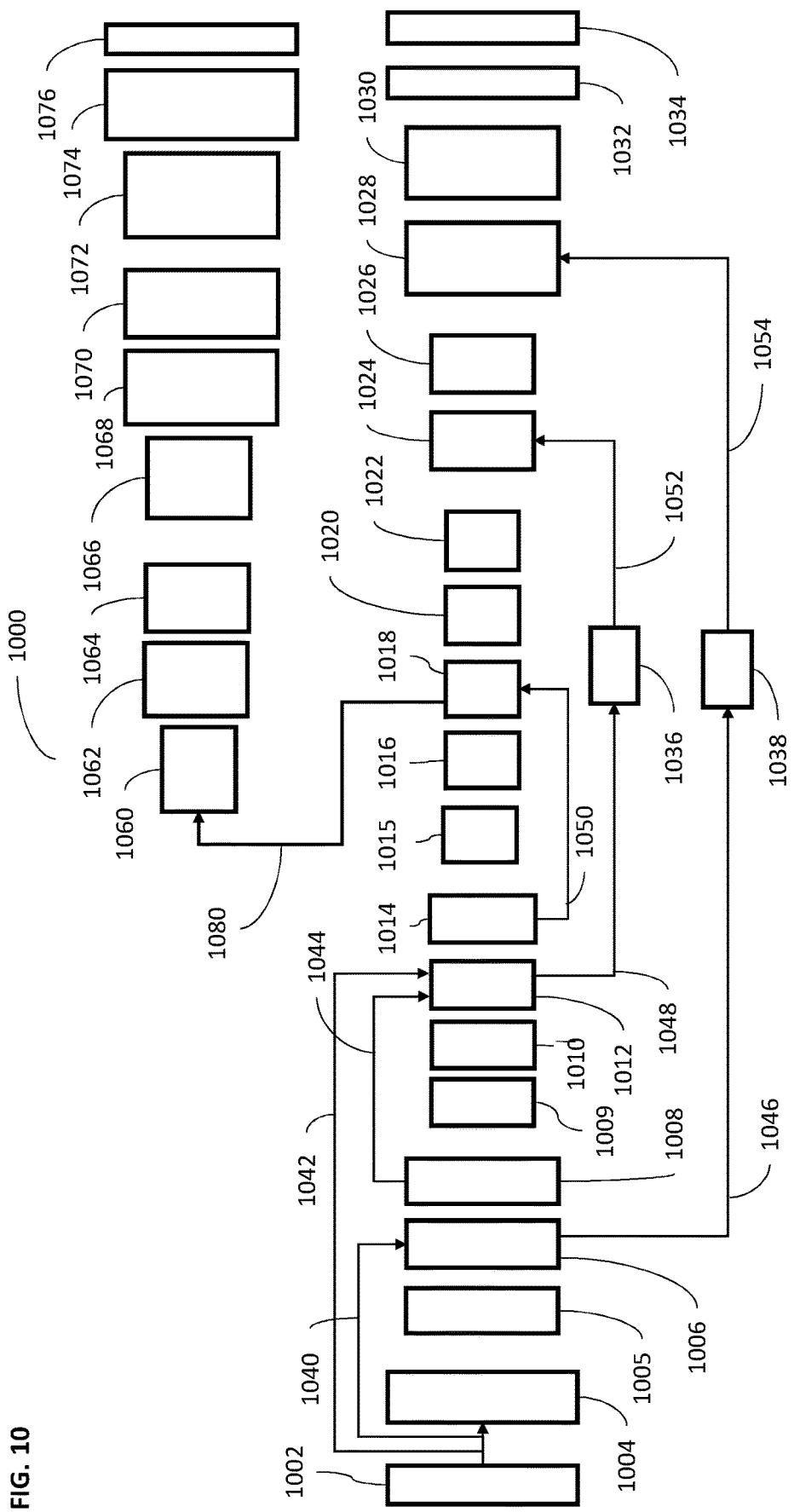
FIG. 10 shows an embodiment of a deep neural network 1000 that may be trained to estimate both classification estimates and depth estimates.

FIG. 10 shows an embodiment of a deep neural network 1000 that may be trained to estimate both classification estimates and depth estimates. DNN 1000 may be based on the DNN 600, which could produce exclusively classification estimates, but DNN 1000 deviates from DNN 600 in that it employs extra decoding layers that can produce depth estimates.

The resulting DNN 1000 comprises an encoder, composed of layers 1002 to 1018, which may be common for both depth estimation and classification estimation; and two decoders: one composed of layers 1022 to 1034, estimating classification, the other, composed of layers 1060 to 1076 estimating depth.

The input layer 1002 may be functionally equivalent to layer 602.

The inner layers of the common encoder are described in Table 4 wherein the columns of Table 4 have the same interpretation of the columns of Table 1. Furthermore, the Type column may indicate the type of the layers, wherein the label Convolution may indicate that the corresponding layer may be a convolution layer; the label Deconvolution may indicate that the corresponding layer may be a deconvolution layer; the label ESP may indicate that the corresponding layer may be configured as an Efficient Spatial Pyramid (ESP) module, which may be a form of convolution layer functionally equivalent to 700; the label LSTM may indicate that the corresponding layer may be a recurrent convolution layer including at least one Long Short-Term Memory (LSTM) unit; and the label Softmax may indicate that the Softmax function may be applied to the corresponding layer. The column I/O Channels describes the number of input/output channels of the corresponding layer. The column Scaling at output provides a parameter determining the scaling of the output.

TABLE 4

Description of the layers of the common encoder of DNN 1000

| Reference | Layer | Type | I/O Channels | Scaling at output | Input |
|---|---|---|---|---|---|
| 1004 | 1004 | Convolution | 3/32 | 2 | 1002 |
| 1005 | 1005 | LSTM | 32/32 | 2 | 1004 |
| 1008 | 1008-1 | ESP | 32/64 | 4 | 1002 & 1005 |
| 1009 | 1009 | LSTM | 64/64 | 4 | 1008-1 |
| 1010 | 1010-2 | ESP | 64/64 | 4 | 1009 |
| 1010 | 1010-3 | ESP | 64/64 | 4 | 1010-2 |
| 1014 | 1014-4 | ESP | 64/128 | 8 | 1002 & 1010-2 & 1010-3 |
| 1016 | 1016-5 | ESP | 128/128 | 8 | 1014-4 |
| 1016 | 1016-6 | ESP | 128/128 | 8 | 1016-5 |
| 1016 | 1016-7 | ESP | 128/128 | 8 | 1016-6 |
| 1016 | 1016-8 | ESP | 128/128 | 8 | 1016-7 |
| 1016 | 1016+9 | ESP | 128/128 | 8 | 1016-8 |
| 1016 | 1016-10 | ESP | 128/128 | 8 | 1016+9 |
| 1016 | 1016-11 | ESP | 128/128 | 8 | 1016-10 |
| 1016 | 1016-12 | ESP | 128/128 | 8 | 1016-11 |

The first decoder which may estimate classification may involve layers 1020 to 1032 which may be configured as described in Table 5. Table 5 assumes the same structure and the same interpretation of Table 4.

TABLE 5

Description of the layers of the classification decoder of DNN 1000

| Reference | Layer | Type | I/O Channels | Scaling at output | Inputs |
|---|---|---|---|---|---|
| 1020 | 1020 | Convolution | 256/19 | 8 | 1014-4 & 1016-12 |
| 1022 | 1022 | Deconvolution | 19/19 | 4 | 1020 |
| 1036 | 1036 | Convolution | 131/19 | 4 | 1002 & 1010-2 & 1010-3 |
| 1024 | 1024 | ESP | 38/38 | 4 | 1022 & 1036 |
| 1026 | 1026 | Deconvolution | 38/19 | 2 | 1024 |
| 1038 | 1038 | Convolution | 35/19 | 2 | 1002 & 1005 |
| 1028 | 1028 | Convolution | 38/19 | 2 | 1026 & 1038 |
| 1030 | 1030 | Deconvolution | 19/19 | 1 | 1028 |
| 1032 | 1032 | Softmax | 19/1 | 1 | 1030 |

The second decoder which may estimate depth may involve layers 1060 to 1076 which may be configured as described in Table 6 which assumes the same structure and the same interpretation of Table 6.

TABLE 6

Description of the layers of the depth decoder of DNN 1000

| References | Layer | Type | I/O Channels | Scaling at output | Inputs |
|---|---|---|---|---|---|
| 1060 | 1060 | Deconvolution | 256/32 | 4 | 1014-4 & 1016-12 |
| 1062 | 1062 | Convolution | 32/64 | 4 | 1060 |
| 1064 | 1064 | LSTM | 64/64 | 4 | 1062 |
| 1066 | 1066 | Deconvolution | 64/16 | 2 | 1064 |
| 1068 | 1068 | Convolution | 16/32 | 2 | 1066 |
| 1070 | 1070 | LSTM | 32/32 | 2 | 1068 |
| 1072 | 1072 | Deconvolution | 32/8 | 1 | 1070 |
| 1074 | 1074 | Convolution | 8/1 | 1 | 1072 |

The additional layers 1006, 1012 and 1018 are concatenation layers required to merge information from different connections. The layers in neural network 1000 may be fully connected or partially connected, furthermore the connections 1040, 1042, 1044 and 1050 allow the computation performed within some layers to be transferred forward allowing the natural implementation of an identity function by skipping some layers in the connection. As a consequence, the neural network may learn faster and to compute more complex functions. A similar effect may be achieved with connections 1046, 1048, 1052, and 1054.

The output layer 1034 may indicate the estimated classification of the objects detected in the image encoded in layer 1002 and the probability of such encoding.

In some embodiments, the training of DNN 1000 may be performed in two phases; first, the classification network, composed by the common encoder and the classification decoder, may be trained possibly using backpropagation.

Once the classification network may be trained, the training of the depth estimation network composed of the common encoder and the second decoder may be performed. The training of the depth estimation network may be based on backpropagation but in this case, backpropagation may be limited to train the second decoder without affecting the parameters of the common encoder. The training of the depth estimating neural network may require a loss function, such as function (2), to evaluate the error of the estimates as described in relation with FIG. 9.

The training of the neural network 1000 described above may be generalized to any case in which there are a first neural network and a second neural network wherein the layer of the first neural network is the input layer of the second neural network. In some embodiments, the method for training the neural network may include training the first neural network; subsequently training the second neural network on the first neural network without changing the weights or the structure of the first neural network.

In some embodiments, training the first neural network may include the application of a backpropagation training strategy. In some embodiments, training the second neural network may include the application of a backpropagation training strategy.

In some embodiments, the first neural network may have one or a plurality of hidden layers. In some embodiments, one of the second neural network hidden layers may be the input layer of the second neural network. In some embodiments, the second neural network may have one or a plurality of hidden layers.

Figure 11:
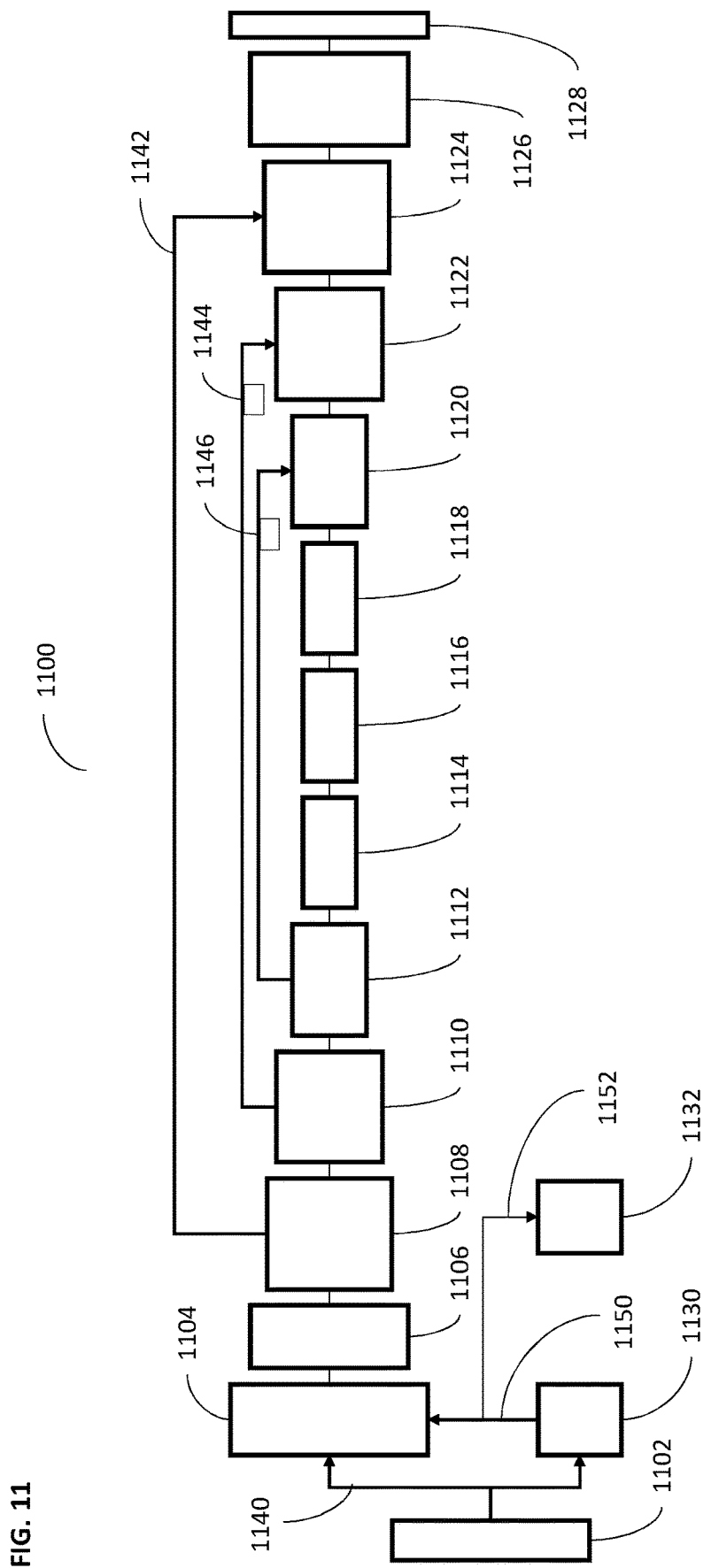
FIG. 11 shows an embodiment of a velocity estimator configured as a deep neural network.

FIG. 11 shows an embodiment of a velocity estimator, such as velocity estimator 414, configured as a deep neural network (DNN) 1100. Neural network 1100 may be based on the exemplary neural network 500, with additional details that allow the network to recognize the velocity of objects in the images.

DNN 1100 may share the same structure of DNN 900 as shown in details in Table 3 with the references to signs in the figure and references to layers in the network remunerated accordingly.

In embodiments, the training of DNN 1100 may require a loss function to evaluate the error of the velocity estimates. In some embodiments, the loss function may be configured to compute a function of the differences between the velocity estimates computed by the neural network 1100 and a plurality of reference values which provide a ground truth on the velocity between the image sensor and the objects displayed in a test image.

In some embodiments, the error function may assign to each image an error value determined in accord with the following formula (3).

$$\sum_i \|v_i - v_{GT}\| \quad (3)$$

wherein $v_i$ may be the one velocity estimate extracted from the ith pixel;

$v_{GT}$ may be the one velocity reference value.

In some embodiments, the output of a classification estimator 1130, which may be a neural network functionally equivalent to neural network 600 or 1000 or any other type of estimator functionally equivalent to estimator 416, may provide an additional input to convolution layer 1104 through connector 1150.

In some embodiments, the output of a depth estimator 1132, which may be a neural network functionally equivalent to neural network 900 or 1000 or any other type of estimator functionally equivalent to estimator 412, may provide an additional input to convolution layer 1104 through connector 1152.

Figure 12:
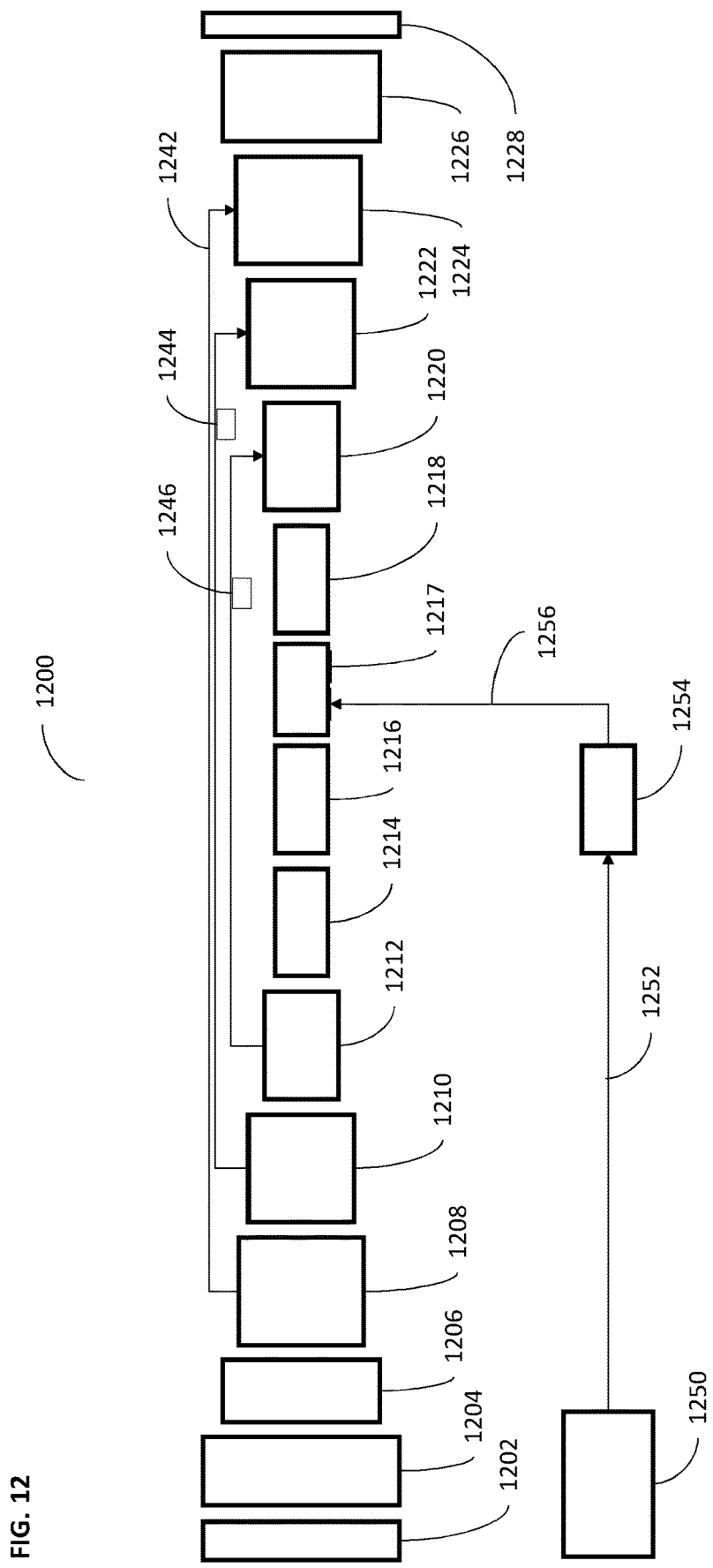
FIG. 12 shows an embodiment of an odometry estimator configured as a deep neural network.

FIG. 12 shows an embodiment of an odometry estimator, such as odometry estimator 418, configured as a deep neural network (DNN) 1200. Neural network 1200 may be based on the exemplary neural network 500, with additional details that allow the network to recognize the movements of the image sensor.

The input layer 1202 encodes an image and it may be functionally equivalent to layer 502. The output layer of CNN 1200 may be the layer 1228. In some embodiments, the units in layer 1228 may encode a depth measure, in other words a distance measure, that may indicate the amount of movement of the image sensor. In other embodiments, the units in layer 1228 may encode a rotation matrix and a translation vector, wherein the translation matrix provides an estimate of the horizontal and vertical rotation of the vehicle, in other words of how much the vehicle turned left or right, and how much the vehicle moved uphill or downhill. Furthermore, the units in layer 1228 may also encode the translation vector which may indicate how much the vehicle moved.

The inner layers of the network are described in Table 7 wherein the columns of Table 7 have the same interpretation as in Table 1, with the only exception that the Type column may indicate the type of the layer, wherein the label Convolution may indicate that the corresponding layer may be a convolution layer; the label Max Pool may indicate that the corresponding layer may be a max pooling layer; the label Res Block may indicate that the corresponding layer may be a residual block layer, which may be functionally equivalent to the residual block module 800; the label Up-project may indicate that the corresponding layer may be an up-project layer which may be functionally equivalent to the up-project module 850; and the label Deconvolution may indicate that the corresponding layer may be a deconvolution layer; the label LSTM may indicate that the corresponding layer may be a recurrent convolution layer including at least one Long Short-Term Memory (LSTM) unit.

TABLE 7

Description of the layers of the depth decoder of DNN 1200

| Reference | Layer | Type | I/O Channels | Scaling at output | Inputs |
|---|---|---|---|---|---|
| 1204 | 1204 | Convolution | 3/32 | 2 | 1202 |
| 1206 | 1206 | Max Pool | 32/32 | 4 | 1204 |
| 1208 | 1208-1 | Res Block | 32/128 | 4 | 1206 |
| 1208 | 1208-2 | Res Block | 128/128 | 4 | 1208-1 |
| 1208 | 1208-3 | Res Block | 128/128 | 4 | 1208-2 |
| 1208 | 1208-4 | Res Block | 128/256 | 8 | 1208-3 |
| 1210 | 1210-5 | Res Block | 256/256 | 8 | 1208-4 |
| 1210 | 1210-6 | Res Block | 256/256 | 8 | 1210-5 |
| 1210 | 1210-7 | Res Block | 256/256 | 8 | 1210-6 |
| 1210 | 1210-8 | Res Block | 256/512 | 16 | 1210-7 |
| 1212 | 1212-9 | Res Block | 512/512 | 16 | 1210-8 |
| 1212 | 1212-10 | Res Block | 512/512 | 16 | 1212-9 |
| 1212 | 1212-11 | Res Block | 512/512 | 16 | 1212-10 |
| 1212 | 1212-12 | Res Block | 512/512 | 16 | 1212-11 |
| 1212 | 1212-13 | Res Block | 512/512 | 16 | 1212-12 |
| 1212 | 1212-14 | Res Block | 512/1024 | 32 | 1212-13 |
| 1214 | 1214-15 | Res Block | 1024/1024 | 32 | 1212-14 |
| 1214 | 1214-16 | Res Block | 1024/1024 | 32 | 1214-15 |
| 1216 | 1216 | Convolution | 1024/512 | 32 | 1214-16 |
| 1217 | 1217 | LSTM | 512/512 | 16 | 1216 |
| 1218 | 1218 | Up-project | 512/256 | 16 | 1217 |
| 1220 | 1220 | Up-project | 256/128 | 8 | 1218 & 1212-13 |
| 1222 | 1222 | Up-project | 128/64 | 4 | 1220 & 1210-7 |
| 1224 | 1224 | Up-project | 64/32 | 2 | 1222 & 1208-3 |
| 1226 | 1226 | Deconvolution | 32/1 | 1 | 1224 |

In some embodiments, neural network 1200 may also contain additional connections. In such embodiments, at least one of the layers referenced by 1208 may be further connected to layer 1224 through connector 1242; at least one of the layers referenced by 1210 may be connected to layer 1222 through connector 1244; and at least one of the layers referred by 1212 may be connected to layer 1220 through connector 1246.

Sign 1250 may provide a value which may indicate the magnitude, in other words the length, of the visual sensor translation vector. The visual sensor translation vector may indicate the movements of the visual sensor. In some embodiments, the visual sensor translation vector may be calculated from the vehicle translation network which may be derived from the vehicle translation sensors. In some embodiments, such sensors may include one or more inertial sensors. In some embodiments, the vehicle translations sensors the translation vector may be computed by the inertial measurement unit (IMU).

In some embodiments, connector 1252 may be used to transmit the magnitude of the visual sensor translation vector to the reshape operator 1254. The reshape operator 1254 may force the magnitude of the translation vector to fit the size of layer 1217 so that the magnitude of the visual sensor translation vector may be used as input of DNN 1200. In some embodiments, the output of the DNN 1200 may be equal to the length of the visual sensor translation vector.

Figure 13:
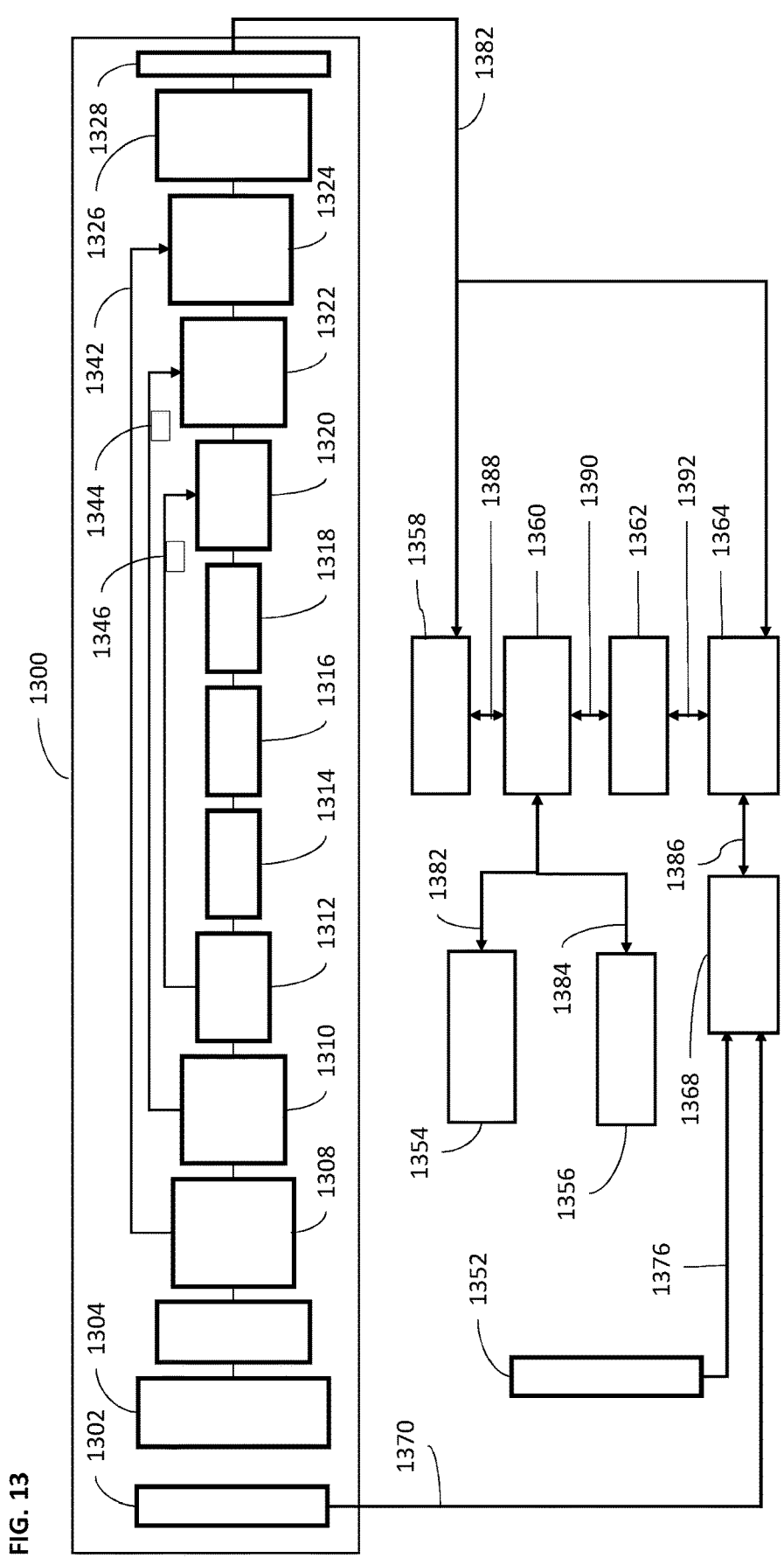
FIG. 13 shows an alternative embodiment of an odometry estimator configured as a deep neural network.

FIG. 13 shows an alternative embodiment of an odometry estimator, such as odometry estimator 418, configured as a deep neural network (DNN) 1300, and of a process to train DNN 1300 using a ground truth based exclusively on optical information.

DNN 1300 is delimited by Layer 1302 may be an input layer that may encode an image and that may be functionally equivalent to layer 502; and layer 1328 that may be an output layer in which the odometry estimates may be reported. In some embodiments, the units in layer 1328 may encode a depth measure, in other words a distance measure, that may indicate the amount of movement of the image sensor. In other embodiments, the units in layer 1328 may encode a rotation matrix and a translation vector, wherein the translation matrix may provide an estimate of the horizontal and vertical rotation of the vehicle, in other words of how much the vehicle turned left or right, and how much the vehicle moved uphill or downhill. Furthermore, the units in layer 1328 may also encode the translation vector which may indicate how much the vehicle moved. The neural network 1300 may be described in detail the table 8 which has the same structure of table 3.

TABLE 8

Description of the layers of the depth decoder of DNN 1300

| Reference | Layer | Type | I/O Channels | Scaling at output | Inputs |
|---|---|---|---|---|---|
| 1304 | 1304 | Convolution | 3/32 | 2 | 1302 |
| 1306 | 1306 | Max Pool | 32/32 | 4 | 1304 |
| 1308 | 1308-1 | Res Block | 32/128 | 4 | 1306 |
| 1308 | 1308-2 | Res Block | 128/128 | 4 | 1308-1 |
| 1308 | 1308-3 | Res Block | 128/128 | 4 | 1308-2 |
| 1308 | 1308-4 | Res Block | 128/256 | 8 | 1308-3 |
| 1310 | 1310-5 | Res Block | 256/256 | 8 | 1308-4 |
| 1310 | 1310-6 | Res Block | 256/256 | 8 | 1310-5 |
| 1310 | 1310-7 | Res Block | 256/256 | 8 | 1310-6 |
| 1310 | 1310-8 | Res Block | 256/512 | 16 | 1310-7 |
| 1312 | 1312-13 | Res Block | 512/512 | 16 | 1310-8 |
| 1312 | 1312-10 | Res Block | 512/512 | 16 | 1312-9 |
| 1312 | 1312-11 | Res Block | 512/512 | 16 | 1312-10 |
| 1312 | 1312-12 | Res Block | 512/512 | 16 | 1312-11 |
| 1312 | 1312-13 | Res Block | 512/512 | 16 | 1312-12 |
| 1312 | 1312-14 | Res Block | 512/1024 | 32 | 1312-13 |
| 1314 | 1314-15 | Res Block | 1024/1024 | 32 | 1312-14 |
| 1314 | 1314-16 | Res Block | 1024/1024 | 32 | 1314-15 |
| 1316 | 1316 | Convolution | 1024/512 | 32 | 1314-16 |
| 1318 | 1318 | Up-project | 512/256 | 16 | 1316 |
| 1320 | 1320 | Up-project | 256/128 | 8 | 1318 & 1312-13 |
| 1322 | 1322 | Up-project | 128/64 | 4 | 1320 & 1310-7 |
| 1324 | 1324 | Up-project | 64/32 | 2 | 1322 & 1308-3 |
| 1326 | 1326 | Deconvolution | 32/1 | 1 | 1324 |

Training DNN 1300 may require an estimate of the movements of the vehicle as ground truth estimate against which to build a backpropagation process. In some embodiments, such estimates may be obtained from automotive sensors within the vehicle itself. It may be then possible to measure the difference between with the estimates from the sensors and the estimates from the DNN 1300 and then perform backpropagation. In such embodiments, a loss function may be constructed on the bases of formulae (2) and (3) above.

In some embodiments, the ground truth estimate of the movements of the vehicle required for the training of DNN 1300 may be extracted from the images that may have been detected by the visual sensor using analytical mathematical methods. Such methods may provide an estimate of the movements of the image sensor across pictures. In turn, those estimates may provide a ground truth that can be then utilized to define a loss function for backpropagation training of DNN 1300. In these embodiments, the estimates of the movements of the visual sensor may be estimated automatically without requiring any annotation of the images.

In some embodiments, estimates of the rotations and translations of each object detected in the images and the rotations and translations of the visual sensor may be encoded in the output layer of RNN 1300. The loss function may evaluate whether these estimates are correct by projecting the 3D points on the different images and then by checking whether the 3D points are projected in the right locations when compared with estimates performed analytically.

A process that may perform an analytical mathematical analysis required to estimate the movements of the image sensor across images may start with a 3D projection to a point cloud of the outputs of DNN 1300. Such 3D projection may be performed by component 1358 which received the odometry estimates through connector 1382. The resulting point cloud may be transmitted to component 1360 through connector 1388. The component 1360 transforms the point cloud through two transformation components: the first one, 1354, may apply the rotation matrix that describes the rotations of the vehicle that was derived by DNN 1300 and the second transformation, 1356, may apply the translation vector that describes the movement of the vehicle. The connectors 1382, and 1384 may represent the data transfers from component 1360 to and from components 1354, and 1356.

Component 1362 may receive the output of process 1360 through connector 1390, and it may project the point cloud to 2D.

Component 1364 may compute the optical flow on the bases of the 2D point cloud received through connector 1392 from process 1362.

Component 1368 may compute the loss function by combining an optical flow estimate resulting from component 1364 through connector 1386, a first image 1302 which may also be the input of DNN 1300, received by component 1368 through connector 1370, and a second image 1352 received through connector 1376. In some embodiments, the second image 1352 was detected by the image sensor at an exemplary time t while the second picture was detected at an exemplary time t+1.

In some embodiments, the loss function computed by component 1368 may be configured as follows:

$$L_t = \frac{1}{N}\sum_{x,y}^{N} \|I_t(x, y) - I_{t+1}(x', y')\| \quad (4)$$

wherein
N is the number of images detected
I is the intensity function computed to derive the optical flow estimate
x, y, may be the coordinates of the position of the vehicle estimated by DNN 1300
x', y' may be the coordinates of the ground truth positions estimated through the optical flow estimate.

In some embodiments, the components 1358, 1360, 1354, 1356, 1362, 1364, and 1368 may be software components, in such embodiments, the connectors 1388, 1390, 1392, 1386, 1382, and 1384 may be data passing processes across software components, in some embodiments of such data passing process may involve function invocations.

In other words, a method to train a neural network to derive odometric estimates from a single image wherein the neural network estimates odometry values of a vehicle may include determining a ground truth odometry value by means of sensors on the vehicle; determining an error of the neural network odometry estimates with respect to the ground truth odometry value; determining the neural network parameters to reduce the error between ground truth odometry value and the neural network estimates.

In some embodiments, determining the neural network parameters may also include backpropagation of the error through the neural network.

In some embodiments, the sensors on the vehicle may also include the vehicle's inertial measurement unit (IMU) or other automotive sensors.

In some embodiments, the sensors on the vehicle may also include the vehicle's visual sensor such as a monocamera. In such embodiments, image processing methods may be applied to the single image or to a plurality of images including the single image. In some exemplary embodiments, the image processing methods may include optical flow derivations, and or structure motion derivations, and/or deriving a rotation matrix or deriving a translation matrix.

Figure 14:
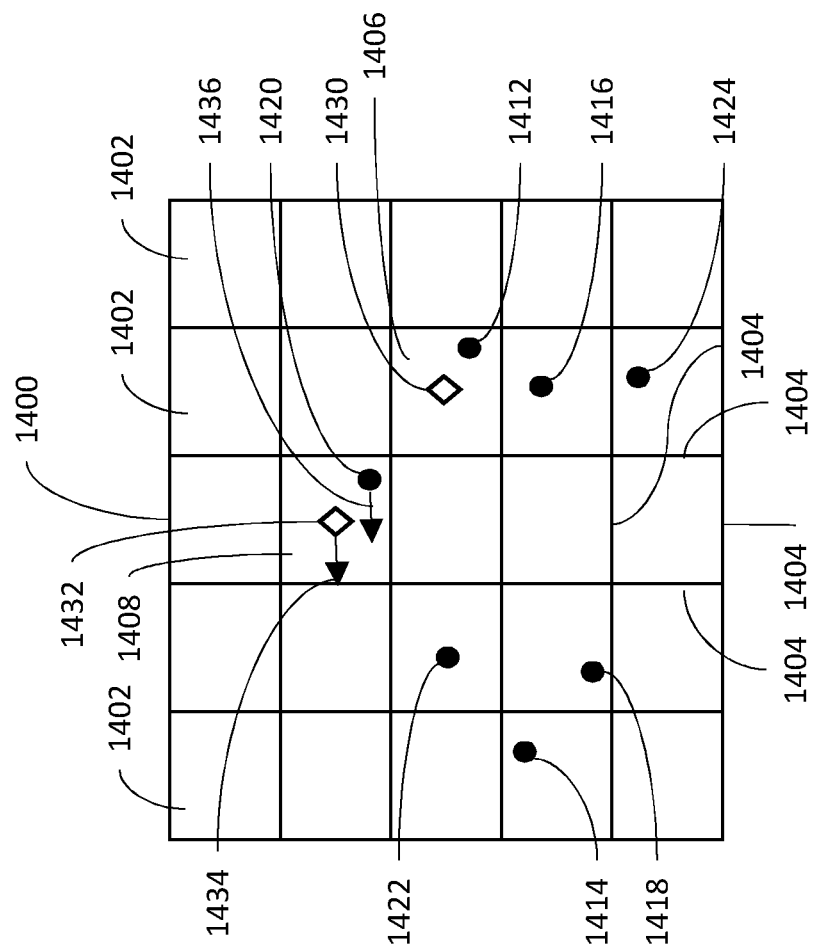
FIG. 14 shows an exemplary dynamic occupancy grid including a plurality of grid cells.

FIG. 14 shows an exemplary dynamic occupancy grid 1400 including a plurality of grid cells 1402. Each grid cell 1402 may be framed by respective grid cell frame lines 1404. In some embodiments, the grid cells may be square or rectangular, in other embodiments grid cells may assume other shapes.

The size of the grid cells may vary: exemplary values for the grid cells size by range a few square centimeters, to a size of a few squared meters. In some embodiments, other cell sizes may be adopted. In some embodiments, smaller grid cells may tend to result in higher resolution. In some exemplary embodiments, grid cells may be smaller closer to the vehicle, where the vehicle may need higher resolution, and bigger at the edges of the grid further from the vehicle where there may be less stringent resolution requirement. In some embodiments, the size and the number of grid cells in an occupancy grid may be determined through an analysis of trade-off between the required resolution and the available resources.

In some embodiments, a dynamic occupancy grid may be associated with a predetermined region, wherein the region may comprise the area of all the cells that are part of the grid. In some embodiments, the predetermined region may be contiguous in which cells may be placed next to each other, as in the case of grid 1400, in other embodiments the dynamic occupancy grid may be fragmented to capture special requirements.

The predetermined region of a dynamic occupancy grid may be a region around the vehicle 100. In some embodiments, the vehicle 100 may be positioned in the center of the occupancy grid and the predetermined region may be a region equally distributed around the vehicle. In other embodiments, vehicle 100 may be positioned at the side of the dynamic occupancy grid, or equivalently at the side of the predetermined region, to accommodate the requirement that more information may be required on one side of the vehicle. In some embodiments, vehicle 100 may be outside the dynamic occupancy grid. In some embodiments, the dynamic occupancy grid may move with vehicle 100.

Grid cells may be associated with particles, wherein each particle may represent one or more sensor readings that may have detected objects present in the area represented by the grid cell. Through the placement of particles, a dynamic occupancy grid may provide information about the location of objects within the predetermined region. A dynamic occupancy grid may be thought as a dynamic map of the predetermined region, alternatively a dynamic occupancy grid may be thought as providing an occupancy hypothesis of the predetermined region, in other words, With reference to FIG. 14, signs 1412, 1414, 1416, 1418, 1420, 1422, 1424 may represent particles that may be positioned in the occupancy grid 1400. The position of these particles may be derived by a particle generator functionally equivalent to the particle generator 226 from depth estimators that may be functionally equivalent to 412 or functionally equivalent to the exemplary DNNs 900 and 1000. Wherein the estimated depth may provide an estimate of the distance of the particle from the vehicle, and of the position of the particle with respect to the vehicle. In some embodiments, particles may be placed on the grid assuming a polar coordinate system centered in the vehicle position.

As a way of example, the particle 1412 may have been generated from the information associated with the pixel 312 and it may represent part of the first wall 302 in the dynamic occupancy grid; particle 1414 may have been generated from the information associated to the pixel 314 and it may represent part of the second wall 304; the particle 1420 may have been generated from the information associated to the pixel 320 and it may represent part of the vehicle 310.

In some embodiments, objects such as the first wall, the second wall and the vehicle, may be represented by a plurality of particles. In some embodiments, such plurality of particles may comprise a large number of particles, wherein the number of the particles generated may depend on the quality of the sensor, wherein high-resolution sensors may generate a larger number of particles, on computational considerations wherein a larger number of particles may require larger amount of computational resources, and by the resolution required, wherein a larger number of particles may lead to a higher resolution.

Particles may also be associated with a velocity which may be represented by a direction of motion and by a speed value. Particles associated with a non-zero velocity may be indicated as dynamic particles, while particles associate with zero velocity may be indicated as static particles. As a way of example, particle 1420, representing part of the vehicle 310, may be a dynamic particle with non-zero velocity in the direction indicated by arrow 1436; while particles 1412 and 1414, both of which represent parts of walls may be static particles with zero velocity.

Particles may also be associated with a label indicating the type of object that they represent in the grid, wherein the type of object may be indicated by a classification estimate that may be derived from an information estimator such has 400. The exemplary particle 1420 may be associated with the type "car" since it may indicate the vehicle 310, while the exemplary particle 1412 may be associated with the label "wall" since it may indicate the first wall 302.

In FIG. 14, the shape 1430 may represent an exemplary single occupancy hypothesis associated to cell 1406, wherein a single occupancy hypothesis may provide an indication of the level of occupation of a cell, of the cell velocity, and of the type of occupation. In some embodiments, a single occupancy hypothesis may be a measure of the likelihood, or of the belief, that the cell is occupied, of the velocity associated with the occupation of the cell. The exemplary cell 1406 may include particles that, like particle 1412, may refer to wall 202, therefore most or all particles in the cell may be static and labeled as "wall". As a consequence, the single occupancy hypothesis 1430 may indicate that the corresponding cell may be static, and that it is a wall. Similarly, shape 1432 may represent an exemplary single occupancy hypothesis for cell 1408. Cell 1408 may include particles that, like particle 1420, may refer to vehicle 310, therefore most or all particles cell 1408 may be dynamic reflecting the velocity of vehicle 310. The arrow 1434 may indicate the direction of motion associated with the non-zero velocity of the single occupancy hypothesis 1430.

In FIG. 14, the signs 1422 and 1424 may represent additional particles that may be provided by additional sensors 204 such as lidar sensors or radar sensors. These particles may contribute to the formulation of any single occupancy hypothesis as much as any other particle In some embodiments, a single occupancy hypothesis, such as single occupancy hypothesis 1430 and 1432, may be determined using the belief mass function, wherein the belief mass of occupation of a cell may be defined as the proportion of particles in the cell with respect to all particles in the dynamic occupancy grid. The belief mass of the velocity may be computed from the distribution of velocities associated with the particles in the cell.

In some embodiments, the belief mass function used to determine the single occupancy hypothesis may be determined in accordance with the following formula:

$$m_s^i(\{S,D\}) = m_{s_1}^i(\{S,D\}) \oplus m_{s_2}^i(\{S,D\}) \oplus \ldots \oplus m_{s_n}^i(\{S,D\}) \quad (5)$$

wherein $m_{s_n}^i(\{S, D\})$ may be the mass belief of the i-th cell;

$\oplus$ may be an evidence combination operator, in some embodiments it may be the Dempster Shafer evidence combination operator;

S may be an indication that the particles in the cell are static;

D may be an indication that the particles in the cell are dynamic;

$s_i$ may indicate the i-th sensor.

Formula (5) may provide a way to compute the belief mass of occupation of cells on the bases of the position value assigned to the particles, while keeping into account technical differences between the sensors, such as precision.

A formula analogous to Formula (5) may indicate how to derive the mass belief of the velocity associated with a cell and the classification label of the cell.

The degree of belief that the grid cell $C_i$ is occupied may be computed by the belief function in the following formula (6)

$$M_s^i(\{S, D\}) = \max_j \left( m_{occ} * e^{-\frac{(x^i - z_t^j)^2}{2*\sigma^2}} \right) \quad (6)$$

wherein:

{S, D} is the type of occupancy of the grid cell wherein:
  S indicates static occupancy;
  D indicates dynamic occupancy;
$m_{occ}$ is the maximum evidence for occupied; it is constant in the range [0:1];
i is the grid cells index;
j is the sensor readings index;
t is a time reading index;

$$e^{-\frac{(x^i - z_t^j)^2}{2\sigma^2}}$$

is a Gaussian function wherein:
  $x^i$ is the center of the i-th grid cell;
  $z_t^j$ is the position of the j-th sensor reading at time t;
  $\sigma$ is a parameter determining the slope of the Gaussian.

In formula (6), the Gaussian function acts as a discount factor wherein the measurements $z_t^j$ that are further from $x^i$ provide a reduced contribution to the occupancy of grid cell i; furthermore the use of the $\max_j$ function selects the sensor j measurement that contributes the most to a grid cell, removing the contribution of all the others. Finally, it should be observed that formula (6) returns values that are included between 0 and 1. In other words, the contribution of a sensor information value to the degree of belief of occupancy of the grid cell i substantially decreases with an increase of a distance of the location of the object detected by the sensor from $x^i$.

In some embodiments, the value $\sigma$ in formula (6) may be related to the standard deviation of the values of x with respect to z. In such cases, $m_s^i(\{S, D\})$ may have mathematical properties of the probabilistic normal distribution.

Figure 15:
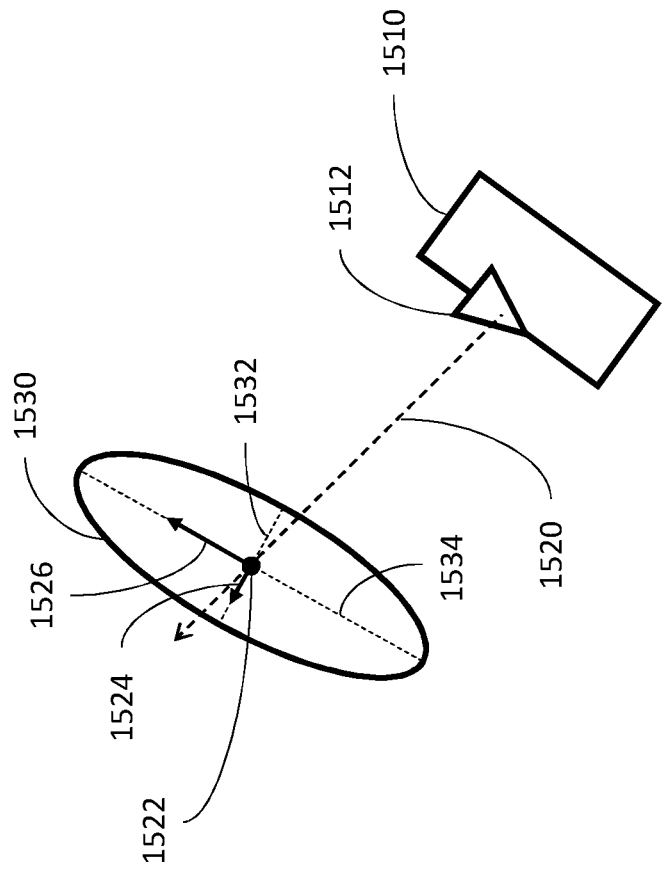
FIG. 15 shows the derivation of the particles velocity distribution value and the error distribution.

FIG. 15 shows the derivation of the particles velocity distribution and the error distribution associated with the velocity estimate produced by sensors that provide velocity information under the assumption of a Gaussian error distribution. The sign 1510 represents a hypothetical vehicle with an image sensor 1512 which detects an image in the direction indicated by the arrow 1520. The image may lead to the generation of a plurality of particles some of which may be associated with a cell whose center may be described by the point 1522. Each particle in the cell may have a different velocity value. The velocity of the cell may be described by the arrow 1524 and 1526, wherein 1524 may be a hypothetical velocity in the x-direction or $v_x$, and 1526, a hypothetical velocity in the y direction or $v_y$. The variance of the velocity distribution may be described by the lines 1532 and 1534. This may lead to a velocity distribution that may be indicated by the oval 1530.

In the embodiments, velocity estimate may be computed in accord with the following formula:

$$m_{s_j}^i(\{S, D\}) = \begin{cases} A * e^{\left(-\left(\frac{(v_x - \overline{v_x})^2}{2*\sigma_{v_x}^2} + \frac{(v_y - \overline{v_y})^2}{2*\sigma_{v_y}^2}\right)\right)} & \text{for particles in } D \\ 0 & \text{for particles in } S \end{cases} \quad (7)$$

$\overline{v_x}$ is the mean velocity in the x direction, of the particles generated by the sensor j and associated with grid cell i;

$\overline{v_y}$ is the mean velocity in they direction, of the particles generated by the sensor j and associated with grid cell i;

$v_x$ and $v_y$ are two variables;

$\sigma_{v_x}^2$ is the variance of the velocity in the x direction, of the particles generated by the sensor j and associated with grid cell i;

$\sigma_{v_y}^2$ is the variance of the velocity in the y direction, of the particles generated by the sensor j and associated with grid cell I;

A is the amplitude coefficient

In some embodiments, at least one sensor cannot provide velocity information. In these embodiments, a single occupancy hypothesis determiner, such as single occupancy hypothesis determiner 110, may not have any information about the velocity associated with the particles generated by the sensor. In such embodiments, the single occupancy determiner 110 may assign to the particles without velocity information a stochastic velocity value extracted from a predefined probability distribution. In some embodiments, such stochastic velocity value may be assigned in accord with the following formulae (8) and (9):

$$P(v_0^i \mid z_0^i) = w_{dyn} * U\left(\begin{pmatrix} -v_{max} \\ -v_{max} \end{pmatrix}, \begin{pmatrix} v_{max} \\ v_{max} \end{pmatrix}\right) + w_{static} * \delta\begin{pmatrix} 0 \\ 0 \end{pmatrix} \quad (7)$$

wherein $$w_{dyn} + w_{static} = 1 \quad (8)$$

wherein

U may be the uniform distribution;

$$\delta\begin{pmatrix} 0 \\ 0 \end{pmatrix}$$

may be the Dirac distribution of static particles with zero velocity;

$w_{dyn}$ may be a parameter indicating the expected proportion of dynamic particles, in other words with non-zero velocity;

$w_{static}$ may be a parameter indicating the expected proportion of static particles, in other words with zero velocity;

$$\begin{pmatrix} -v_{max} \\ -v_{max} \end{pmatrix}, \begin{pmatrix} v_{max} \\ v_{max} \end{pmatrix}$$

indicate velocities that may be uniformly distributed in that region.

In some embodiments, the parameters $w_{dyn}$ and $w_{static}$ may be estimated from the type of objects that occupy the area represented by a grid cell.

The image sensor 202, as well as all the additional sensors 204, may produce noisy readings that may result in faulty particles. As a result, free areas may not be recognized as such and a vehicle functionally equivalent to vehicle 100 may be led to avoid obstacles that do not exist, and/or occupied areas may be recognized as free possibly leading to accidents.

Figure 16:
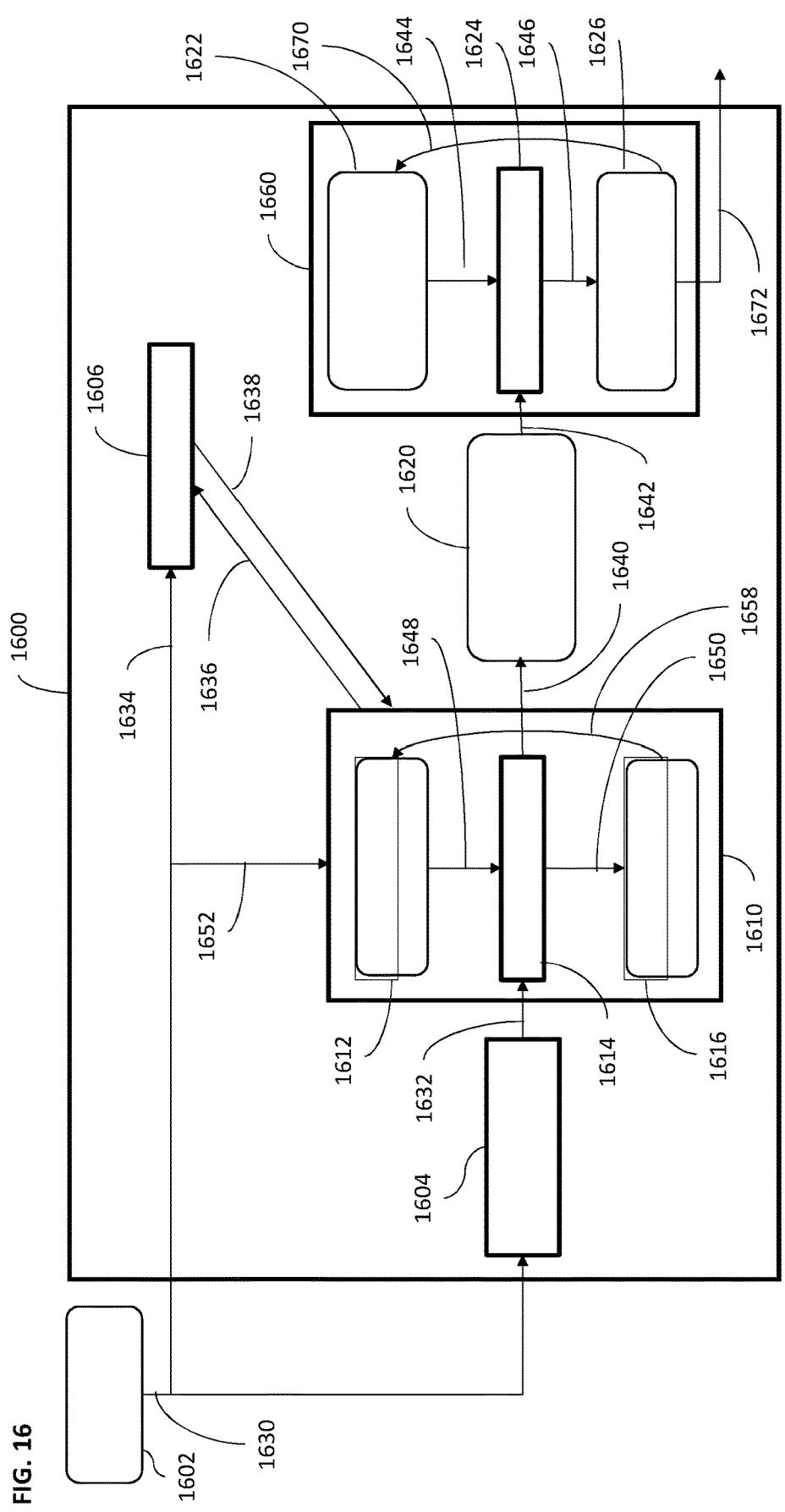
FIG. 16 shows an embodiment of an occupancy hypothesis determiner.

FIG. 16 shows an embodiment of an occupancy hypothesis determiner 1600 that may be functionally equivalent to the occupancy hypothesis determiner 230. The occupancy hypothesis determiner 1600 may generate one or a plurality of occupancy grids that may be transmitted to the exemplary automotive controller 114 through connector 132.

The signs 1604, 1610, 1614, 1606 1660, and 1624 may represent processes; while the signs 1602, 1612, 1616 1620 1622 and 1626 may represent data. The interpretation of the connectors changes consequently. Connectors connecting processes may indicate data flow and/or control flow; connectors connecting processes and data may indicate input/output relations; connectors connecting data may indicate data transformations which in some embodiments may simply be data identity or data assignment.

The input of the occupancy hypothesis determiner 1600 may be sensory information 1602 in the form of a plurality of particles that the occupancy hypothesis determiner 1600 receives through connector 1630 which may be functionally equivalent to connector 220.

In 1604, the occupancy hypothesis determiner 1600 may determine a sensors-based dynamic occupancy grid which may include the particles received through connector 1630. The computation of the sensors-based dynamic occupancy grid may also involve the computation of the belief masses corresponding to each cell of the sensors-based dynamic occupancy grid, wherein the computation of the belief masses may be performed in accordance with formula (5).

In some embodiments, sensors may produce faulty readings which may result in erroneous particles to be added to the dynamic occupancy grid. Such faulty particles may need to be removed from the dynamic occupancy grid to improve its accuracy.

The occupancy hypothesis determiner 1600 may improve the dynamic occupancy grid through two filter processes. The first filter 1610 may be a particle filter the second filter 1660 may be based on the Dempster Shafer filter theory of evidence.

The particle filter 1610 may take into account the velocity of the particles as indicated by the connector 1652 and an object tracking process 1606 which may be based on the classification estimation transmitted through connector 1634. The object tracking process 1606 may provide to the particle filter 1610, through connector 1638, information about the objects in the dynamic grid that may result in a reduction of the number of particles. The particle filter 1610 may provide to the tracking process 1606 information about particles through connector 1636 that may result in improved object dimensions.

The particle filter 1610 may be an iterative process wherein at every iteration cycle a first dynamic occupancy grid 1612 may be transmitted through connector 1648 to a mapping process 1614 to generate a second dynamic occupancy grid 1616. At the conclusion of the iteration, the second dynamic occupancy grid 1616 may be transformed in the first dynamic occupancy grid of the following iteration cycle as indicated by connector 1658. In some embodiments, the transformation function may be the identity function.

The mapping process 1614 may comprise of a combination of particles weighting, particle merging with the sensors-based dynamic occupancy grid 1604, transmitted to the particle filter through connector 1632, particle projection and re-sampling.

The result of the particle filtering, as indicated by connector 1640, may be an evidence-based dynamic occupancy grid 1620, wherein each cell of the evidence-based dynamic occupancy grid may be associated with a mass belief of the type of occupation of the cell in the dynamic occupancy grid.

In some embodiments, the evidence-based dynamic occupancy grid 1620 may be functionally equivalent to the second updated dynamic occupancy grid 1616.

In some embodiments, the evidence-based dynamic occupancy grid 1620 may differ from the second updated dynamic occupancy grid 1616 in that the values of each cell of the dynamic occupancy grid may indicate the belief masses associated with the cell determined in accord with formula (5).

The evidence-based dynamic occupancy grid 1620 may be further improved through the second filter 1660 may be based on the Dempster Shafer theory of evidence. In some embodiments, the second filter may be a Dempster Shafer filter.

The second filter 1660 may be based on a Dempster Shafer map process 1624 that may transform a first evidence-based dynamic occupancy grid 1622 received through connector 1644, into output a second evidence-based dynamic occupancy grid 1626 as indicated by connector 1646 through the inclusion of information from the evidence-based dynamic occupancy grid 1620 received through connector 1642. The second evidence-based dynamic occupancy grid 1626 may be the output of filter 1660 and of the occupancy hypothesis determiner 1600.

The connector 1670 may indicate that the second evidence-based dynamic occupancy grid 1626 may become the first evidence-based dynamic occupancy grid 1622 of the next iteration of the process. In some embodiments, connector 1670 may be implemented as a variable assignment.

In some embodiments, the Dempster Shafer map process 1624 may be defined according to the Dempster-Shafer theory of evidence, wherein the frame of discernment may be defined according to the following formula:

$$\Theta = \{F, S, D\} \quad (9)$$

wherein
F indicates free space;
S indicates static space;
D indicates dynamic space.

The power set of the frame of discernment $2^\Theta$ is defined as $$2^\Theta = \{\emptyset, \{F\}, \{S\}, \{D\}, \{S,D\}, \{F,S,D\}\} \quad (10)$$

wherein
it is assumed that {F,S} and {F,D} are empty;
∅ indicates the empty set.

The Dempster Shafer map process 1624 may be based on the following formulae (10).

$$m_{t-1}(F) = m_{t-1}(F) + m_{t-1}(D) \quad (10)$$

$$m_{t-1}(D) = 0$$

wherein
$m_{t-1}$ indicates the belief masses of the first evidence-based dynamic occupancy grid 1622;
$m_{t-1}(F)$ indicates the belief masses of free cells;
$m_{t-1}(D)$ indicates the belief masses of dynamic cells;

Formulae (10) assumes that from time t−1 to t all dynamic objects, such as vehicles, represented in the first evidence-based dynamic occupancy grid by the mass belief $m_{t-1}(D)$ may have moved away and the corresponding space have been freed. Therefore, there is no more evidence of any dynamic object.

Formula (11) below may specify the belief masses of the second evidence-based dynamic occupancy grid wherein the evidence for dynamic objects all comes from the evidence-based dynamic occupancy grid 1620 while the other belief masses are updated accordingly.

$$m_t(D) = m_s(D) \quad (11)$$

$$m_t(X)_{X \subseteq \Theta \setminus \{D, \emptyset\}} = w \frac{m_{t-1}(X)m_s(\Theta) + m_{t-1}(\Theta)m_s(X)}{m_{t-1}(\Theta) + m_s(\Theta) + m_{t-1}(\Theta)m_s(\Theta)}$$

$$m_t(\Theta)_{X \subseteq \Theta \setminus \{D, \emptyset\}} = w \frac{m_{t-1}(\Theta)m_s(\Theta)}{m_{t-1}(\Theta) + m_s(\Theta) - m_{t-1}(\Theta)m_s(\Theta)}$$

$$w = \frac{(1 - m_s(D))m_{t-1}(\Theta) + m_s(\Theta) - m_{t-1}(\Theta)m_s(\Theta)}{\sum_{X \subseteq \Theta \setminus \{D, 0\}} m_{t-1}(X)m_s(\Theta) + m_{t-1}(\Theta)m_s(X)}$$

wherein
$m_{t-1}$ indicates the belief masses of the first evidence-based dynamic occupancy grid 1622;
$m_t$ indicates the belief masses of the second evidence-based dynamic occupancy grid 1626;
$m_s$ indicates the belief masses of the evidence-based dynamic occupancy grid 1620;
Θ is the set defined in (9);
D indicates dynamic space;
∅ indicates the empty set;
$X \supseteq \Theta \setminus \{D, \emptyset\}$ is defined as the set Θ with the exclusion of D and ∅.

The output connector 1672, which may be functionally equivalent to connector 240 in FIG. 2, may indicate that at each time instance t the second evidence-based dynamic occupancy grid may be transmitted to other components as the estimate of the occupation in the predetermined area. In some embodiments, the second evidence-based dynamic occupancy grid may indicate the occupancy around vehicle 100.

Figure 17:
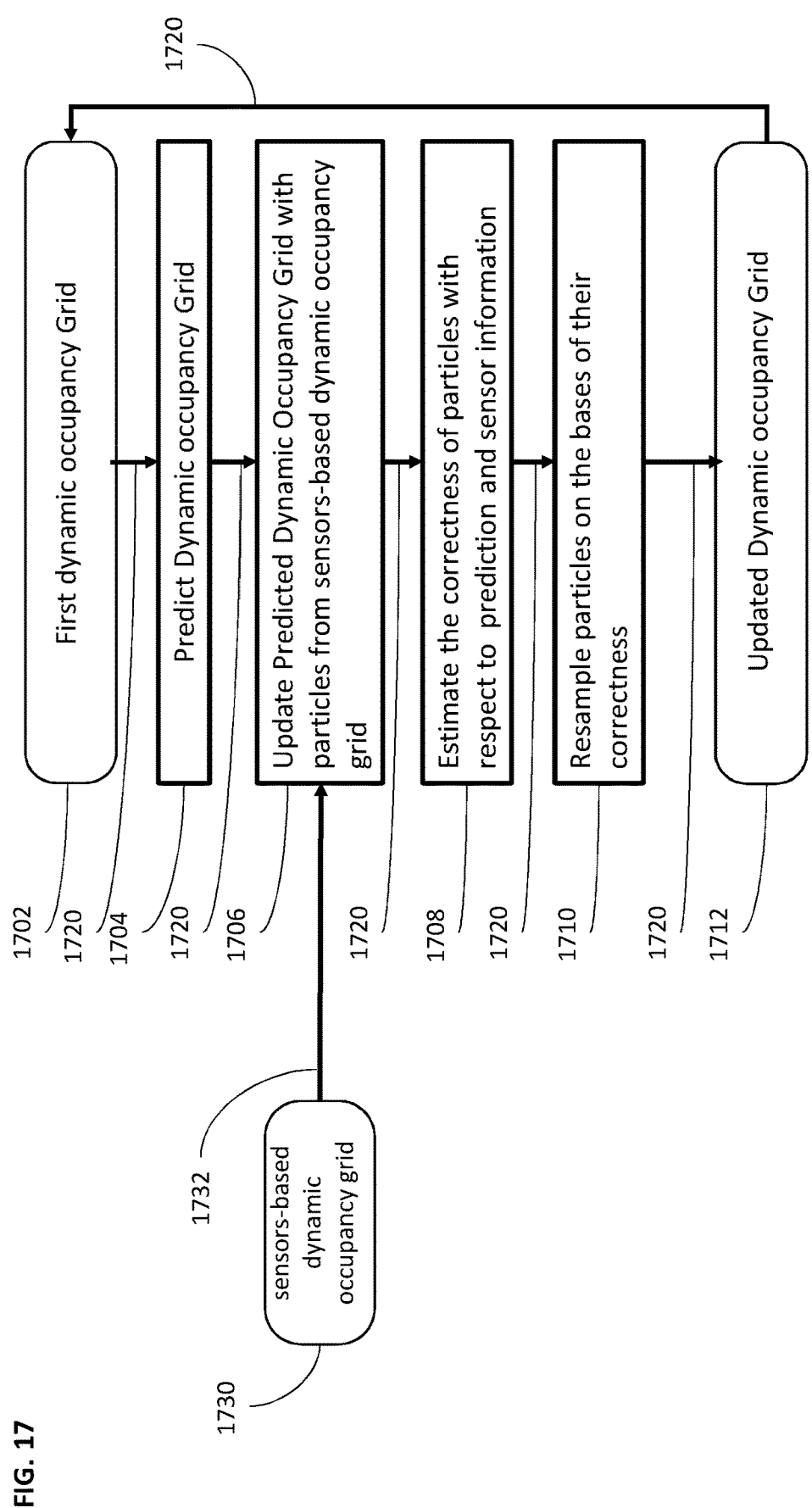
FIG. 17 shows a block diagram indicating the processes executed by the particle filter.

FIG. 17 shows a block diagram indicating the processes executed by the particle filter 1610. The core process of the particle filter begins with a first dynamic occupancy grid 1702 representing the state of the predetermined region at a given exemplary time t and proceeds to generate a second updated dynamic occupancy grid 1712 that may represent the predetermined region at a time t+1.

In FIG. 17, the first dynamic occupancy grid 1702 may be functionally equivalent to the first dynamic occupancy grid 1612; the second updated dynamic occupancy grid 1712 may be functionally equivalent to second updated, dynamic occupancy grid 1616, the processes 1704, 1706, 1708, 1710 may be processes that when appropriately combined may result in a process functionally equivalent to process 1614.

In 1704, the position of the particles in the first dynamic occupancy grid 1702 is updated using their velocity information. Specifically, the particles are expected to travel and constant velocity for a given fixed time interval. The result of the update process is a dynamic occupancy grid that predicts the state of the predetermined area at an exemplary time t+1. The resulting dynamic occupancy grid may be indicated as predicted dynamic occupancy grid.

In 1706, the predicted dynamic occupancy grid is further updated by including particles from the sensors-based dynamic occupancy grid 1730 which may be transmitted through connector 1732. In some embodiments, the sensor-based dynamic occupancy grid 1730 may be generated by the process described in 1604. The dynamic occupancy grid that may result from updating the predicted dynamic occupancy grid with the sensors-based dynamic occupancy grid 1730 may be indicated as an updated dynamic occupancy grid.

In 1708, the likelihood of particles correctness in the updated dynamic occupancy grid is estimated. Particles that that may be both in the prediction dynamic occupancy grid and in the sensors-based dynamic occupancy grid are considered to be likely to be correct, other particles are considered to be less likely to be correct. The resulting dynamic occupancy grid may be indicated as correction-estimate dynamic occupancy grid.

In 1710, particles in the correction-estimate dynamic occupancy grid are re-sampled on the bases of their correctness, wherein particles estimated to be correct may be more likely to be sampled, while particles with lower likelihood may not be sampled. This sampling process may perform a filtering process in which particles with a low likelihood to be correct may tend to be discarded. Sampled particles may be added to the second updated dynamic occupancy grid 1712 which may provide a better representation of the state of the predetermined region.

The connectors 1720 indicate the second updated dynamic occupancy grid 1712 may become the first dynamic occupancy grid 1702 of the next iteration of the process. In some embodiments, connector 1720 may be implemented as a variable assignment.

Figure 18:
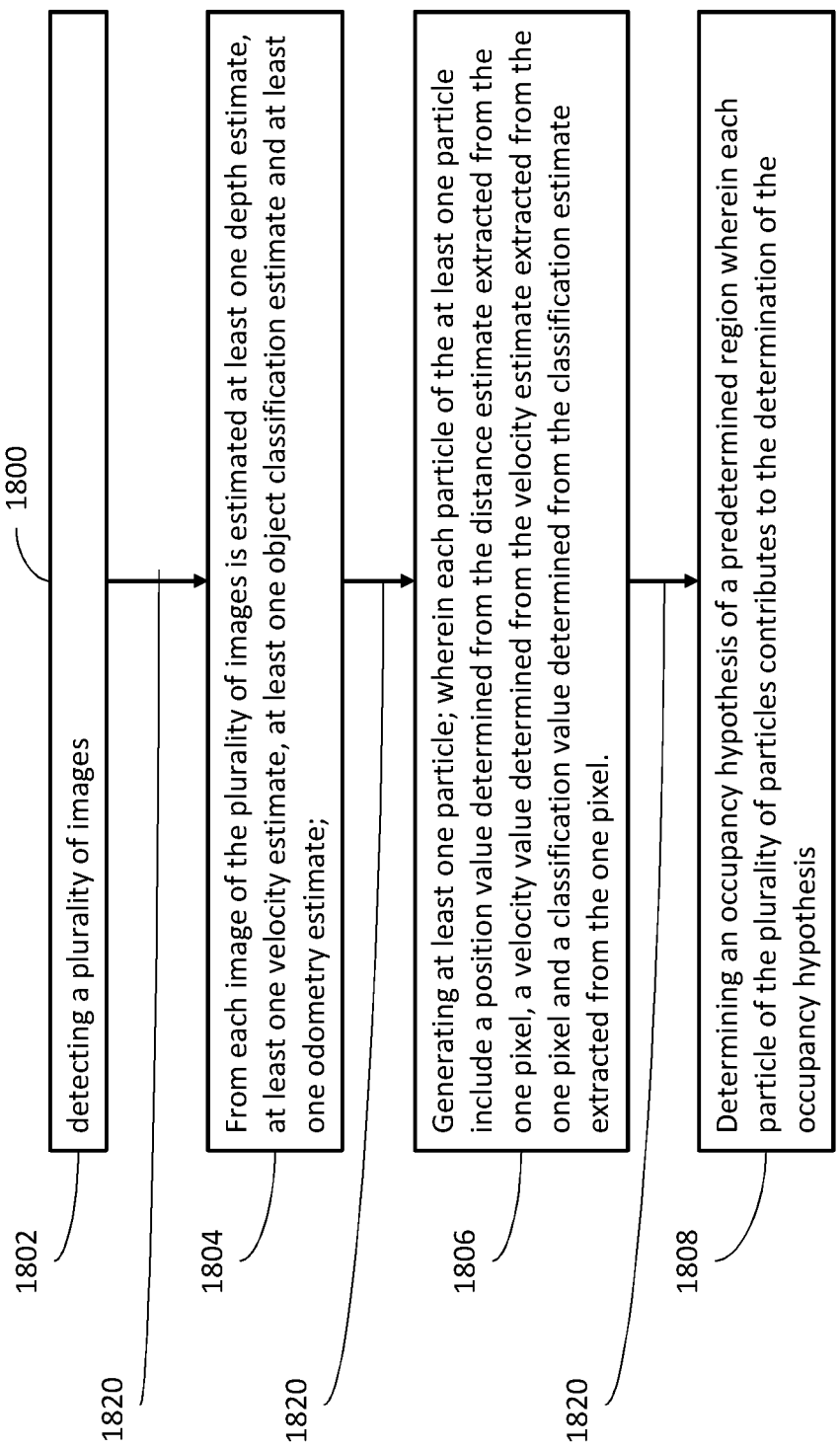
FIG. 18 shows a method for the generation of a dynamic occupancy grid on the bases of an image detected by an image sensor.

FIG. 18 shows a method 1800 for the generation of a dynamic occupancy grid on the bases of an image detected by an image sensor.

In process 1802, a plurality of images may be detected

In process 1804, from each image of the plurality of images at least one depth estimate, at least one velocity estimate, at least one object classification estimate and at least one odometry estimate are estimated;

In process 1806, a plurality of particles is generated, wherein each particle of the plurality of particles comprises a position value determined from the depth estimate, a velocity value determined from the velocity estimate and a classification value determined from the classification estimate; and In process 1808, an occupancy hypothesis of a predetermined region is determined wherein each particle of the plurality of particles contributes to the determination of the occupancy hypothesis.

The connectors 1820, may represent the temporal relations between the processes in method 1800.

Figure 19:
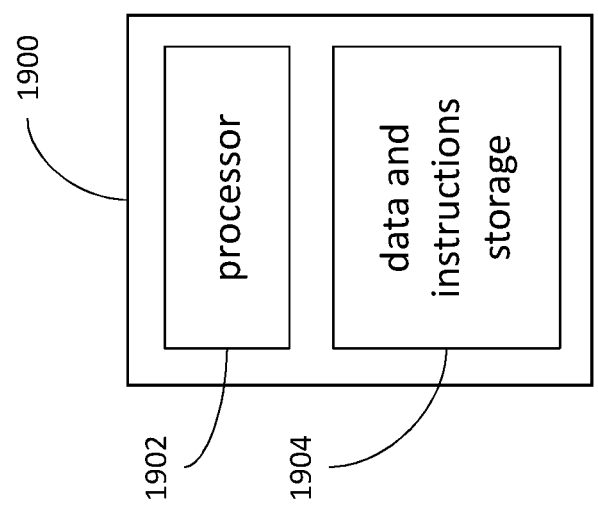
FIG. 19, shows a computer readable medium including one or a plurality of processor and one or more data and instructions storage.

FIG. 19 shows a computer readable medium 1900 including one or a plurality of processor 1902 and one or more data and instructions storage 1904.

The components of the vehicle 100, and in particular the perception device may be implemented by a non-transient computer readable medium 1900 storing, in the data and instructions storage 1904, a plurality of instructions implementing the method 1800 required by those components. In the case of the perception device 102, the computer readable medium 1800 may store a plurality of instructions implementing a method to detect the position of objects in the predetermined region.

The computer-readable medium 1800 may include a plurality of processors 1802 and/or one or a plurality of controllers, now shown. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It may be understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The computer-readable medium 1800 may also be a virtualized device which may be executed by one or more physical devices. In addition, the computer readable medium may be a network device residing in a cloud, or it may be configured to execute some functions in the cloud for example through remote API calls.

In the following, various examples are provided with reference to the aspects described above.

Example 1 is a perception device, including at least one image sensor configured to detect a plurality of images; an information estimator configured to estimate from each image of the plurality of images a depth estimate, a velocity estimate, an object classification estimate and an odometry estimate; a particle generator configured to generate a plurality of particles, wherein each particle of the plurality of particles comprises a position value determined from the depth estimate, a velocity value determined from the velocity estimate and a classification value determined from the classification estimate; an occupancy hypothesis determiner configured to determine an occupancy hypothesis of a predetermined region, wherein each particle of the plurality of particles contributes to the determination of the occupancy hypothesis.

In example 2, the subject matter of example 1 may optionally include that the image sensor comprises or is a monocamera.

In example 3, the subject matter of example 1 or 2 may optionally include that each image comprises a plurality of pixels.

In example 4, the subject matter of any one of examples 1 to 3 may optionally include that each pixel in the plurality of pixels is described by three values, wherein a first value of the three values specifies a green color level of the pixel, a second value of the three values specifies a red color level of the pixel, and a third value of the three values specifies a yellow color level of the pixel.

In example 5, the subject matter of any one of examples 1 to 4, may optionally include that each pixel in the plurality of pixels represents a portion of an object depicted in an image received by the image sensor.

In example 6, the subject matter of any one of examples 1 to 5, may optionally include that the plurality of pixels is organized in a 2-dimensional matrix of pixels.

In example 7, the subject matter of any one of examples 1 to 6, may optionally include that the depth estimate is an estimate of the distance from a portion of an object depicted in an image received by the image sensor to the image sensor; that the velocity estimate is an estimate of the velocity of the portion of an object depicted in an image received by the image sensor with respect to the image sensor; that the object classification is one or more labels of a predefined set of labels wherein the label represents a classification of the portion of an object depicted in an image received by the image sensor; that the odometry estimate is the one measure of distance of movement of the image sensor.

In example 8, the subject matter of any one of the examples 1 to 7, may optionally include that the information estimator comprises: at least one depth estimator configured to estimate the at least one depth estimate from the each image of the plurality of images; at least one velocity estimator configured to estimate the at least one velocity estimate from the each image of the plurality of images; at least one classification estimator configured to estimate the at least one classification estimate from the each image of the plurality of images; and at least one odometry estimator configured to estimate the at least one odometry estimate from the each image of the plurality of images.

In example 9, the subject matter of any one of examples 1 to 8, may optionally include that at least one of the depth estimator, velocity estimator, classification estimator, odometry estimator is configured as a neural network; and that the input layer of the neural network comprises a plurality of network portions, and that each network portion of the plurality of network portions corresponds to at least one pixel of the plurality of pixels.

In example 10, the subject matter of example 9, may optionally include that the neural network comprises a plurality of inner layers;

In example 11, the subject matter of any one of examples 9 or 10 may optionally include that at least one layer of the plurality of layers is configured as convolution layer.

In example 12, the subject matter of any one of examples 9 to 11, may optionally include that at least one layer of the plurality of layers is configured as a deconvolution layer.

In example 13, the subject matter of any one of examples 1 to 12, may optionally include that the classification estimator is configured as a neural network; and that an output layer of the neural network comprises at least one network portion denoting the classification label.

In example 14, the subject matter of example 13, may optionally include that at least one network portion of the output layer denoting the classification label further indicates a classification probability.

In example 15, the subject matter of any one of examples 11 to 14, may optionally include that at least one convolution layer of the plurality of layers is configured as an Efficient Spatial Pyramid module.

In example 16, the subject matter of any one of examples 1 to 12, wherein a depth estimator is configured as a neural network; wherein an output layer of the neural network comprises at least one network portion denoting a distance estimate.

In example 17, the subject matter of example 16, may optionally include that at least one convolution layer of the plurality of inner layers is configured as a Residual Network.

In example 18, the subject matter of any one of examples 16 or 17, may optionally include that the input layer of the neural network comprises at least one network portion denoting a classification label.

In example 19, the subject matter of any one of examples 16 to 18, may optionally include that a loss function of the distance estimator is configured to compute the sum of the differences between the distance estimate and one distance reference value; and that the training of the distance estimator does not involve the training of the classificatory estimator.

In example 20, the subject matter of example 19, may optionally include that the loss function of the distance estimator is configured to compute the following formula:

$$\Sigma \|D_i - D_{GT}\|$$

wherein
$D_i$ is the one distance estimate;
$D_{GT}$ is the one depth reference value;
$\|\ldots\|$ indicates the absolute value function.

In example 21, the subject matter of any one of examples 13 to 20, may optionally include that an internal layer of the classification estimator neural network is the input of the depth estimator neural network.

In example 22, the subject matter of any one of examples 16 to 21, may optionally include that the training of the depth estimator neural network is configured to train the classification estimator neural network; subsequently train the distance estimator neural network on the classification estimator without changing the weights or structure of the classification estimator neural network.

In example 23, the subject matter of any one of examples 8 to 12, may optionally include that the velocity estimator is configured as a neural network; and that an output layer of the neural network comprises at least one network portion denoting a velocity estimate.

In example 24, the subject matter of example 23, may optionally include that an input layer of the neural network comprises at least one network portion denoting a classification label, or that an input layer of the neural network comprises at least one network portion denoting a depth estimate.

In example 25, the subject matter of any one of examples 23 or 24, may optionally include that a loss function of the velocity estimator is configured to compute the sum of the differences between the velocity estimates and one velocity reference value.

In example 26, the subject matter of any one of examples 23 to 25, may optionally include that a loss function of the velocity estimator is configured to compute the following formula:

$$\Sigma \|V_i - V_{GT}\|$$

wherein
$V_i$ is the velocity estimate extracted from the ith pixel;
$V_{GT}$ is the one velocity reference value;
$\|\ldots\|$ indicates the absolute value function.

In example 27, the subject matter of any one of examples 8 to 12, may optionally include that the odometry estimator is configured as a neural network; and that an output layer of the neural network comprises at least one network portion denoting am odometry estimate.

In example 28, the subject matter of example 27, may optionally include that the odometry estimate includes at least one distance estimate and/or velocity estimate.

In example 29, the subject matter of any one of examples 27 or 28, may optionally include that a loss function of the odometry estimator is configured to compute the average odometry estimate error with respect to the future odometry estimates.

In example 30, the subject matter of any one of examples 27 to 29, may optionally include that a loss function of the velocity estimator is configured to compute the following formula:

$$L_t^{color} = \frac{1}{N} \sum_{x,y}^{N} \|I_t(x, y) - I_{t+1}(x', y')\|$$

wherein $I_t$ is an odometry estimate at time instant t;
$I_{t+1}$ is an odometry estimate at time instant t+1;
N is the number of time instants;
$\|\ldots\|$ indicates the absolute value function.

In example 31, the subject matter of any one of examples 1 to 30, further including: at least one lidar sensor; and/or at least one radar sensor.

In example 32, the subject matter of example 31, may optionally include that the information estimator is further configured to process signals received from the at one lidar sensor and/or from the at least one radar sensor.

In example 33, the subject matter of any one of examples 1 to 32, may optionally include that the particle generator is further configured to determine the particle value adding an error rate to the pixel velocity.

In example 34, the subject matter of example 33, may optionally include that the error rate is normally distributed in accordance with a predefined standard deviation and mean.

In example 35, the subject matter of any one of examples 33 or 34, may optionally include that the mean error rate is 0.

In example 36, the subject matter of any one of examples 1 to 35, may optionally include that the occupancy hypothesis is a dynamic occupancy grid including a plurality of grid cells; that each grid cell represents an area in the predetermined region; that at least one of the grid cells is associated with a single occupancy hypothesis; and that the single occupancy hypothesis comprises an occupancy value, a velocity value, and a classification value.

In example 37, the subject matter of example 36, may optionally include that the occupancy value of the single occupancy hypothesis comprises a likelihood distribution of the occupancy level of the grid cell.

In example 38, the subject matter of examples 36 or 37, may optionally include that the velocity value of the single occupancy hypothesis comprises a likelihood distribution of the velocity of the grid cell.

In example 39, the subject matter of any one of examples 36 to 38, may optionally include that the classification value of the single occupancy hypothesis comprises a likelihood distribution of the classification of the grid cell.

In example 40, the subject matter of any one of examples 36 to 39, may optionally include that the single occupancy hypothesis determiner is configured to determine the single occupancy hypothesis in accordance with the following formula $$m_s^i(\{S,D\}) = m_{s_1}^i(\{S,D\}) \oplus m_{s_2}^i(\{S,D\}) \oplus \ldots \oplus m_{s_n}^i(\{S,D\})$$

wherein $m_{s_q}^i(\{S,D\})$ is the mass belief of the nth sensor;
$\oplus$ is the Dempster Shafer evidence combination operator;
S is an indication that the particles in the cell are static;
D is an indication that the particles in the cell are dynamic.

In example 41, the subject matter of any one of examples 36 to 40, may optionally include that the single occupancy hypothesis determiner is configured to determine the velocity value of sensor information associated to sensors that cannot provide velocity information in accordance with the following formula:

$$p(v_0^i | z_0^i) = w_{dyn} * U\left(\begin{pmatrix} -v_{max} \\ -v_{max} \end{pmatrix}, \begin{pmatrix} v_{max} \\ v_{max} \end{pmatrix}\right) + w_{static} * \delta\begin{pmatrix} 0 \\ 0 \end{pmatrix}$$

wherein $w_{dyn} - w_{static} = 1$ wherein

U is the uniform distribution;
$\delta$ is the Dirac distribution.

In example 42, the subject matter of any one of examples 1 to 41, may optionally include that the occupancy hypothesis is associated with a time instant.

In example 43, the subject matter of any one of examples 1 to 42, may optionally include that the occupancy hypothesis determiner is further configured to filter particles in the occupancy hypothesis.

In example 44, the subject matter of example 43, may optionally include that the occupancy hypothesis determiner is further configured to filter particles in the occupancy hypothesis using a particle filter.

In example 45, the subject matter of any one of examples 43 or 44, may optionally include that the occupancy hypothesis determiner is further configured to filter the occupancy hypothesis using a Dempster Shafer filter.

In example 46, the subject matter of example 45, may optionally include that the Dempster Shafer filter is based on a Dempster Shafer map.

In example 47, the subject matter of any one of examples 45 or 46, may optionally include that the Dempster Shafer map is based on the Dempster Shafer theory of evidence.

In example 48, the subject matter of any one of examples 45 to 47, may optionally include that the Dempster Shafer map is further configured to transform a first evidence-based dynamic occupancy grid into a second evidence-based dynamic occupancy grid.

Example 49 is a perception method determining an occupancy hypothesis of a predetermined region, the method including: detecting a plurality of images; estimating from each image of the plurality of images at least one depth estimate, at least one velocity estimate, at least one object classification estimate and at least one odometry estimate; generating a plurality of particles, wherein each particle of the plurality of particles comprises a position value determined from the depth estimate, a velocity value determined from the velocity estimate and a classification value determined from the classification estimate; and determining an occupancy hypothesis of a predetermined region wherein each particle of the plurality of particles contributes to the determination of the occupancy hypothesis.

In example 50, the subject matter of example 49 may optionally include that the image sensor comprises or is a monocamera.

In example 51, the subject matter of example 49 or 50 may optionally include that each image comprises a plurality of pixels.

In example 52, the subject matter of any one of examples 49 to 51 may optionally include that each pixel in the plurality of pixels is described by three values, wherein a first value of the three values specifies a green color level of the pixel, a second value of the three values specifies a red color level of the pixel, and a third value of the three values specifies a yellow color level of the pixel.

In example 53, the subject matter of any one of examples 49 to 52, may optionally include that each pixel in the plurality of pixels represents a portion of an object depicted in an image received by the image sensor.

In example 54, the subject matter of any one of examples 49 to 53, may optionally include that the plurality of pixels is organized in a 2-dimensional matrix of pixels.

In example 55, the subject matter of any one of examples 49 to 54, may optionally include that the depth estimate is an estimate of the distance from a portion of an object depicted in an image received by the image sensor to the image sensor; that the velocity estimate is an estimate of the velocity of the portion of an object depicted in an image received by the image sensor with respect to the image sensor; that the object classification is one or more labels of a predefined set of labels wherein the label represents a classification of the portion of an object depicted in an image received by the image sensor; that the odometry estimate is the one measure of distance of movement of the image sensor.

In example 56, the subject matter of any one of the examples 49 to 55, may optionally include that the information estimator comprises: at least one depth estimator configured to estimate the at least one depth estimate from the each image of the plurality of images; at least one velocity estimator configured to estimate the at least one velocity estimate from the each image of the plurality of images; at least one classification estimator configured to estimate the at least one classification estimate from the each image of the plurality of images; and at least one odometry estimator configured to estimate the at least one odometry estimate from the each image of the plurality of images.

In example 57, the subject matter of any one of examples 49 to 56, may optionally include that at least one of the depth estimator, velocity estimator, classification estimator, odometry estimator is configured as a neural network; and that the input layer of the neural network comprises a plurality of network portions, and that each network portion of the plurality of network portions corresponds to at least one pixel of the plurality of pixels.

In example 58, the subject matter of example 57, may optionally include that the neural network comprises a plurality of inner layers;

In example 59, the subject matter of any one of examples 57 or 58 may optionally include that at least one layer of the plurality of layers is configured as convolution layer.

In example 60, the subject matter of any one of examples 57 to 59, may optionally include that at least one layer of the plurality of layers is configured as a deconvolution layer.

In example 61, the subject matter of any one of examples 49 to 60, may optionally include that the classification estimator is configured as a neural network; and that an output layer of the neural network comprises at least one network portion denoting the classification label.

In example 62, the subject matter of example 61, may optionally include that at least one network portion of the output layer denoting the classification label further indicates a classification probability.

In example 63, the subject matter of any one of examples 59 to 62, may optionally include that at least one convolution layer of the plurality of layers is configured as an Efficient Spatial Pyramid module.

In example 64, the subject matter of any one of examples 49 to 60, wherein a depth estimator is configured as a neural network; wherein an output layer of the neural network comprises at least one network portion denoting a distance estimate.

In example 65, the subject matter of example 64, may optionally include that at least one convolution layer of the plurality of inner layers is configured as a Residual Network.

In example 66, the subject matter of any one of examples 64 or 65, may optionally include that the input layer of the neural network comprises at least one network portion denoting a classification label.

In example 67, the subject matter of any one of examples 64 to 66, may optionally include that a loss function of the distance estimator is configured to compute the sum of the differences between the distance estimate and one distance reference value; and that the training of the distance estimator does not involve the training of the classificatory estimator.

In example 68, the subject matter of example 67, may optionally include that the loss function of the distance estimator is configured to compute the following formula:

$$\Sigma \|D_i - D_{GT}\|$$

wherein $D_i$ is the one distance estimate;

$D_{GT}$ is the one depth reference value;

$\| \ldots \|$. indicates the absolute value function.

In example 69, the subject matter of any one of examples 64 to 68, may optionally include that an internal layer of the classification estimator neural network is the input of the depth estimator neural network.

In example 118, the subject matter of any one of examples 67 to 69, may optionally include that the training of the depth estimator neural network is configured to train the classification estimator neural network; subsequently train the distance estimator neural network on the classification estimator without changing the weights or structure of the classification estimator neural network.

In example 71, the subject matter of any one of examples 56 to 60, may optionally include that the velocity estimator is configured as a neural network; and that an output layer of the neural network comprises at least one network portion denoting a velocity estimate.

In example 72, the subject matter of example 71, may optionally include that an input layer of the neural network comprises at least one network portion denoting a classification label, or that an input layer of the neural network comprises at least one network portion denoting a depth estimate.

In example 73, the subject matter of any one of examples 71 or 72, may optionally include that a loss function of the velocity estimator is configured to compute the sum of the differences between the velocity estimates and one velocity reference value.

In example 74, the subject matter of any one of examples 71 to 73, may optionally include that a loss function of the velocity estimator is configured to compute the following formula:

$$\Sigma \|V_i - V_{GT}\|$$

wherein $V_i$ is the velocity estimate extracted from the ith pixel;

$V_{GT}$ is the one velocity reference value;

$\| \ldots \|$. indicates the absolute value function.

In example 75, the subject matter of any one of examples 56 to 60, may optionally include that the odometry estimator is configured as a neural network; and that an output layer of the neural network comprises at least one network portion denoting am odometry estimate.

In example 76, the subject matter of example 75, may optionally include that the odometry estimate includes at least one distance estimate and/or velocity estimate.

In example 77, the subject matter of any one of examples 75 or 76, may optionally include that a loss function of the odometry estimator is configured to compute the average odometry estimate error with respect to the future odometry estimates.

In example 78, the subject matter of any one of examples 75 to 77, may optionally include that a loss function of the velocity estimator is configured to compute the following formula:

$$L_t^{color} = \frac{1}{N} \sum_{x,y}^{N} \|I_t(x, y) - I_{t+1}(x', y')\|$$

wherein
$I_t$ is an odometry estimate at time instant t;
$I_{t+1}$ is an odometry estimate at time instant t+1;
N is the number of time instants;
$\|\ldots\|$. indicates the absolute value function.

In example 79, the subject matter of any one of examples 49 to 78, further including: at least one lidar sensor; and/or at least one radar sensor.

In example 80, the subject matter of example 79, may optionally include that the information estimator is further configured to process signals received from the at one lidar sensor and/or from the at least one radar sensor.

In example 81, the subject matter of any one of examples 49 to 80, may optionally include that the particle generator is further configured to determine the particle value adding an error rate to the pixel velocity.

In example 82, the subject matter of example 81, may optionally include that the error rate is normally distributed in accordance with a predefined standard deviation and mean.

In example 83, the subject matter of any one of examples 81 or 82, may optionally include that the mean error rate is 0.

In example 84, the subject matter of any one of examples 49 to 83, may optionally include that the occupancy hypothesis is a dynamic occupancy grid including a plurality of grid cells; that each grid cell represents an area in the predetermined region; that at least one of the grid cells is associated with a single occupancy hypothesis; and that the single occupancy hypothesis comprises an occupancy value, a velocity value, and a classification value.

In example 85, the subject matter of example 84, may optionally include that the occupancy value of the single occupancy hypothesis comprises a likelihood distribution of the occupancy level of the grid cell.

In example 86, the subject matter of examples 84 or 85, may optionally include that the velocity value of the single occupancy hypothesis comprises a likelihood distribution of the velocity of the grid cell.

In example 87, the subject matter of any one of examples 84 to 86, may optionally include that the classification value of the single occupancy hypothesis comprises a likelihood distribution of the classification of the grid cell.

In example 88, the subject matter of any one of examples 84 to 87, may optionally include that the single occupancy hypothesis determiner is configured to determine the single occupancy hypothesis in accordance with the following formula $$m_s^i(\{S,D\}) = m_{s_1}^i(\{S,D\}) \oplus m_{s_2}^i(\{S,D\}) \oplus \ldots \oplus m_{s_n}^i(\{S,D\})$$

wherein
$m_{s_n}^i(\{S, D\})$ is the mass belief of the nth sensor;
$\oplus$ is the Dempster Shafer evidence combination operator;
S is an indication that the particles in the cell are static;
D is an indication that the particles in the cell are dynamic.

In example 89, the subject matter of any one of examples 84 to 88, may optionally include that the single occupancy hypothesis determiner is configured to determine the velocity value of sensor information associated to sensors that cannot provide velocity information in accordance with the following formula:

$$p(v_0^i \mid z_0^i) = w_{dyn} * U\left(\begin{pmatrix}-v_{max}\\-v_{max}\end{pmatrix}, \begin{pmatrix}v_{max}\\v_{max}\end{pmatrix}\right) + w_{static} * \delta\begin{pmatrix}0\\0\end{pmatrix}$$

wherein $$w_{dyn} - w_{static} = 1$$

wherein
U is the uniform distribution;
$\delta$ is the Dirac distribution.

In example 90, the subject matter of any one of examples 49 to 89, may optionally include that the occupancy hypothesis is associated with a time instant.

In example 91, the subject matter of any one of examples 49 to 90, may optionally include that the occupancy hypothesis determiner is further configured to filter particles in the occupancy hypothesis.

In example 92, the subject matter of example 91, may optionally include that the occupancy hypothesis determiner is further configured to filter particles in the occupancy hypothesis using a particle filter.

In example 93, the subject matter of any one of examples 91 or 92, may optionally include that the occupancy hypothesis determiner is further configured to filter the occupancy hypothesis using a Dempster Shafer filter.

In example 94, the subject matter of example 93, may optionally include that the Dempster Shafer filter is based on a Dempster Shafer map.

In example 95, the subject matter of any one of examples 93 or 94, may optionally include that the Dempster Shafer map is based on the Dempster Shafer theory of evidence.

In example 96, the subject matter of any one of examples 93 to 95, may optionally include that the Dempster Shafer map is further configured to transform a first evidence-based dynamic occupancy grid into a second evidence-based dynamic occupancy grid.

Example 97 is a vehicle including: a perception device, including: at least one image sensor configured to detect a plurality of images; an information estimator configured to estimate from each image of the plurality of images a depth estimate, a velocity estimate, an object classification estimate and an odometry estimate; a particle generator configured to generate a plurality of particles, wherein each particle of the plurality of particles comprises a position value determined from the depth estimate, a velocity value determined from the velocity estimate and a classification value determined from the classification estimate; an occupancy hypothesis determiner configured to determine an occupancy hypothesis of a predetermined region, wherein each particle of the plurality of particles contributes to the determination of the occupancy hypothesis.

In example 98, the subject matter of example 97 may optionally include that the image sensor comprises or is a monocamera.

In example 99, the subject matter of example 97 or 98 may optionally include that each image comprises a plurality of pixels.

In example 100, the subject matter of any one of examples 97 to 99 may optionally include that each pixel in the plurality of pixels is described by three values, wherein a first value of the three values specifies a green color level of the pixel, a second value of the three values specifies a red color level of the pixel, and a third value of the three values specifies a yellow color level of the pixel.

In example 101, the subject matter of any one of examples 97 to 100, may optionally include that each pixel in the plurality of pixels represents a portion of an object depicted in an image received by the image sensor.

In example 102, the subject matter of any one of examples 97 to 101, may optionally include that the plurality of pixels is organized in a 2-dimensional matrix of pixels.

In example 103, the subject matter of any one of examples 97 to 102, may optionally include that the depth estimate is an estimate of the distance from a portion of an object depicted in an image received by the image sensor to the image sensor; that the velocity estimate is an estimate of the velocity of the portion of an object depicted in an image received by the image sensor with respect to the image sensor; that the object classification is one or more labels of a predefined set of labels wherein the label represents a classification of the portion of an object depicted in an image received by the image sensor; that the odometry estimate is the one measure of distance of movement of the image sensor.

In example 104, the subject matter of any one of the examples 97 to 103, may optionally include that the information estimator comprises: at least one depth estimator configured to estimate the at least one depth estimate from the each image of the plurality of images; at least one velocity estimator configured to estimate the at least one velocity estimate from the each image of the plurality of images; at least one classification estimator configured to estimate the at least one classification estimate from the each image of the plurality of images; and at least one odometry estimator configured to estimate the at least one odometry estimate from the each image of the plurality of images.

In example 105, the subject matter of any one of examples 97 to 104, may optionally include that at least one of the depth estimator, velocity estimator, classification estimator, odometry estimator is configured as a neural network; and that the input layer of the neural network comprises a plurality of network portions, and that each network portion of the plurality of network portions corresponds to at least one pixel of the plurality of pixels.

In example 106, the subject matter of example 105, may optionally include that the neural network comprises a plurality of inner layers;

In example 107, the subject matter of any one of examples 105 or 106 may optionally include that at least one layer of the plurality of layers is configured as convolution layer.

In example 108, the subject matter of any one of examples 105 to 107, may optionally include that at least one layer of the plurality of layers is configured as a deconvolution layer.

In example 109, the subject matter of any one of examples 97 to 108, may optionally include that the classification estimator is configured as a neural network; and that an output layer of the neural network comprises at least one network portion denoting the classification label.

In example 110, the subject matter of example 109, may optionally include that at least one network portion of the output layer denoting the classification label further indicates a classification probability.

In example 111, the subject matter of any one of examples 107 to 110, may optionally include that at least one convolution layer of the plurality of layers is configured as an Efficient Spatial Pyramid module.

In example 112, the subject matter of any one of examples 97 to 108, wherein a depth estimator is configured as a neural network; wherein an output layer of the neural network comprises at least one network portion denoting a distance estimate.

In example 113, the subject matter of example 112, may optionally include that at least one convolution layer of the plurality of inner layers is configured as a Residual Network.

In example 114, the subject matter of any one of examples 112 or 113, may optionally include that the input layer of the neural network comprises at least one network portion denoting a classification label.

In example 115, the subject matter of any one of examples 112 to 114, may optionally include that a loss function of the distance estimator is configured to compute the sum of the differences between the distance estimate and one distance reference value; and that the training of the distance estimator does not involve the training of the classificatory estimator.

In example 116, the subject matter of example 115, may optionally include that the loss function of the distance estimator is configured to compute the following formula:

$$\Sigma \| D_i - D_{GT} \|$$

wherein $D_i$ is the one distance estimate;

$D_{GT}$ is the one depth reference value;

$\| \ldots \|$ indicates the absolute value function.

In example 117, the subject matter of any one of examples 112 to 116, may optionally include that an internal layer of the classification estimator neural network is the input of the depth estimator neural network.

In example 118, the subject matter of any one of examples 115 to 117, may optionally include that the training of the depth estimator neural network is configured to train the classification estimator neural network; subsequently train the distance estimator neural network on the classification estimator without changing the weights or structure of the classification estimator neural network.

In example 119, the subject matter of any one of examples 104 to 108, may optionally include that the velocity estimator is configured as a neural network; and that an output layer of the neural network comprises at least one network portion denoting a velocity estimate.

In example 120, the subject matter of example 119, may optionally include that an input layer of the neural network comprises at least one network portion denoting a classification label, or that an input layer of the neural network comprises at least one network portion denoting a depth estimate.

In example 121, the subject matter of any one of examples 119 or 120, may optionally include that a loss function of the velocity estimator is configured to compute the sum of the differences between the velocity estimates and one velocity reference value.

In example 122, the subject matter of any one of examples 119 to 121, may optionally include that a loss function of the velocity estimator is configured to compute the following formula:

$$\Sigma \|V_i - V_{GT}\|$$

wherein $V_i$ is the velocity estimate extracted from the ith pixel;
$V_{GT}$ is the one velocity reference value;
$\|\ldots\|$. indicates the absolute value function.

In example 123, the subject matter of any one of examples 104 to 108, may optionally include that the odometry estimator is configured as a neural network; and that an output layer of the neural network comprises at least one network portion denoting am odometry estimate.

In example 124, the subject matter of example 123, may optionally include that the odometry estimate includes at least one distance estimate and/or velocity estimate.

In example 125, the subject matter of any one of examples 123 or 124, may optionally include that a loss function of the odometry estimator is configured to compute the average odometry estimate error with respect to the future odometry estimates.

In example 126, the subject matter of any one of examples 123 to 125, may optionally include that a loss function of the velocity estimator is configured to compute the following formula:

$$L_t^{color} = \frac{1}{N} \sum_{x,y}^{N} \|I_t(x, y) - I_{t+1}(x', y')\|$$

wherein $I_t$ is an odometry estimate at time instant t;
$I_{t+1}$ is an odometry estimate at time instant t+1;
N is the number of time instants;
$\|\ldots\|$. indicates the absolute value function.

In example 127, the subject matter of any one of examples 97 to 126, further including: at least one lidar sensor; and/or at least one radar sensor.

In example 128, the subject matter of example 127, may optionally include that the information estimator is further configured to process signals received from the at one lidar sensor and/or from the at least one radar sensor.

In example 129, the subject matter of any one of examples 97 to 128, may optionally include that the particle generator is further configured to determine the particle value adding an error rate to the pixel velocity.

In example 130, the subject matter of example 129, may optionally include that the error rate is normally distributed in accordance with a predefined standard deviation and mean.

In example 131, the subject matter of any one of examples 129 or 130, may optionally include that the mean error rate is 0.

In example 132, the subject matter of any one of examples 97 to 131, may optionally include that the occupancy hypothesis is a dynamic occupancy grid including a plurality of grid cells; that each grid cell represents an area in the predetermined region; that at least one of the grid cells is associated with a single occupancy hypothesis; and that the single occupancy hypothesis comprises an occupancy value, a velocity value, and a classification value.

In example 133, the subject matter of example 132, may optionally include that the occupancy value of the single occupancy hypothesis comprises a likelihood distribution of the occupancy level of the grid cell.

In example 134, the subject matter of examples 132 or 133, may optionally include that the velocity value of the single occupancy hypothesis comprises a likelihood distribution of the velocity of the grid cell.

In example 135, the subject matter of any one of examples 132 to 134, may optionally include that the classification value of the single occupancy hypothesis comprises a likelihood distribution of the classification of the grid cell.

In example 136, the subject matter of any one of examples 132 to 135, may optionally include that the single occupancy hypothesis determiner is configured to determine the single occupancy hypothesis in accordance with the following formula $$m_s^i(\{S,D\}) = m_{s_1}^i(\{S,D\}) \oplus m_{s_2}^i(\{S,D\}) \oplus \ldots \oplus m_{s_n}^i(\{S,D\})$$

wherein $m_{s_q}^i(\{S, D\})$ is the mass belief of the nth sensor;
$\oplus$ is the Dempster Shafer evidence combination operator;
S is an indication that the particles in the cell are static;
D is an indication that the particles in the cell are dynamic.

In example 137, the subject matter of any one of examples 132 to 136, may optionally include that the single occupancy hypothesis determiner is configured to determine the velocity value of sensor information associated to sensors that cannot provide velocity information in accordance with the following formula:

$$p(v_0^i | z_0^i) = w_{dyn} * U\left(\begin{pmatrix} -v_{max} \\ -v_{max} \end{pmatrix}, \begin{pmatrix} v_{max} \\ v_{max} \end{pmatrix}\right) + w_{static} * \delta\begin{pmatrix} 0 \\ 0 \end{pmatrix}$$

wherein $$w_{dyn} + w_{static} = 1$$

wherein

U is the uniform distribution;
$\delta$ is the Dirac distribution.

In example 138, the subject matter of any one of examples 97 to 137, may optionally include that the occupancy hypothesis is associated with a time instant.

In example 139, the subject matter of any one of examples 97 to 138, may optionally include that the occupancy hypothesis determiner is further configured to filter particles in the occupancy hypothesis.

In example 140, the subject matter of example 139, may optionally include that the occupancy hypothesis determiner is further configured to filter particles in the occupancy hypothesis using a particle filter.

In example 141, the subject matter of any one of examples 139 or 140, may optionally include that the occupancy hypothesis determiner is further configured to filter the occupancy hypothesis using a Dempster Shafer filter.

In example 142, the subject matter of example 141, may optionally include that the Dempster Shafer filter is based on a Dempster Shafer map.

In example 143, the subject matter of any one of examples 141 or 142, may optionally include that the Dempster Shafer map is based on the Dempster Shafer theory of evidence.

In example 192, the subject matter of any one of examples 141 to 143, may optionally include that the Dempster Shafer map is further configured to transform a first evidence-based dynamic occupancy grid into a second evidence-based dynamic occupancy grid.

Example 145. is a non-transient computer readable medium storing a computer program which, when executed by a processor, implements a perception method determining an occupancy hypothesis of a predetermined region, the method including: detecting a plurality of images; estimating from each image of the plurality of images at least one depth estimate, at least one velocity estimate, at least one object classification estimate and at least one odometry estimate; generating a plurality of particles, wherein each particle of the plurality of particles comprises a position value determined from the depth estimate, a velocity value determined from the velocity estimate and a classification value determined from the classification estimate; and determining an occupancy hypothesis of a predetermined region wherein each particle of the plurality of particles contributes to the determination of the occupancy hypothesis.

In example 146, the subject matter of example 145 may optionally include that the image sensor comprises or is a monocamera.

In example 147, the subject matter of example 145 or 146 may optionally include that each image comprises a plurality of pixels.

In example 148, the subject matter of any one of examples 145 to 147 may optionally include that each pixel in the plurality of pixels is described by three values, wherein a first value of the three values specifies a green color level of the pixel, a second value of the three values specifies a red color level of the pixel, and a third value of the three values specifies a yellow color level of the pixel.

In example 149, the subject matter of any one of examples 145 to 148, may optionally include that each pixel in the plurality of pixels represents a portion of an object depicted in an image received by the image sensor.

In example 150, the subject matter of any one of examples 145 to 149, may optionally include that the plurality of pixels is organized in a 2-dimensional matrix of pixels.

In example 151, the subject matter of any one of examples 145 to 150, may optionally include that the depth estimate is an estimate of the distance from a portion of an object depicted in an image received by the image sensor to the image sensor; that the velocity estimate is an estimate of the velocity of the portion of an object depicted in an image received by the image sensor with respect to the image sensor; that the object classification is one or more labels of a predefined set of labels wherein the label represents a classification of the portion of an object depicted in an image received by the image sensor; that the odometry estimate is the one measure of distance of movement of the image sensor.

In example 152, the subject matter of any one of the examples 145 to 151, may optionally include that the information estimator comprises: at least one depth estimator configured to estimate the at least one depth estimate from the each image of the plurality of images; at least one velocity estimator configured to estimate the at least one velocity estimate from the each image of the plurality of images; at least one classification estimator configured to estimate the at least one classification estimate from the each image of the plurality of images; and at least one odometry estimator configured to estimate the at least one odometry estimate from the each image of the plurality of images.

In example 153, the subject matter of any one of examples 145 to 152, may optionally include that at least one of the depth estimator, velocity estimator, classification estimator, odometry estimator is configured as a neural network; and that the input layer of the neural network comprises a plurality of network portions, and that each network portion of the plurality of network portions corresponds to at least one pixel of the plurality of pixels.

In example 154, the subject matter of example 153, may optionally include that the neural network comprises a plurality of inner layers;

In example 155, the subject matter of any one of examples 153 or 154 may optionally include that at least one layer of the plurality of layers is configured as convolution layer.

In example 156, the subject matter of any one of examples 153 to 155, may optionally include that at least one layer of the plurality of layers is configured as a deconvolution layer.

In example 157, the subject matter of any one of examples 145 to 156, may optionally include that the classification estimator is configured as a neural network; and that an output layer of the neural network comprises at least one network portion denoting the classification label.

In example 158, the subject matter of example 157, may optionally include that at least one network portion of the output layer denoting the classification label further indicates a classification probability.

In example 159, the subject matter of any one of examples 155 to 158, may optionally include that at least one convolution layer of the plurality of layers is configured as an Efficient Spatial Pyramid module.

In example 160, the subject matter of any one of examples 145 to 156, wherein a depth estimator is configured as a neural network; wherein an output layer of the neural network comprises at least one network portion denoting a distance estimate.

In example 161, the subject matter of example 160, may optionally include that at least one convolution layer of the plurality of inner layers is configured as a Residual Network.

In example 162, the subject matter of any one of examples 160 or 161, may optionally include that the input layer of the neural network comprises at least one network portion denoting a classification label.

In example 163, the subject matter of any one of examples 160 to 162, may optionally include that a loss function of the distance estimator is configured to compute the sum of the differences between the distance estimate and one distance reference value; and that the training of the distance estimator does not involve the training of the classificatory estimator.

In example 164, the subject matter of example 163, may optionally include that the loss function of the distance estimator is configured to compute the following formula:

$$\Sigma \| D_i - D_{GT} \|$$

wherein $D_i$ is the one distance estimate;

$D_{GT}$ is the one depth reference value;

$\| \ldots \|$ indicates the absolute value function.

In example 165, the subject matter of any one of examples 112 to 164, may optionally include that an internal layer of the classification estimator neural network is the input of the depth estimator neural network.

In example 166, the subject matter of any one of examples 163 to 165, may optionally include that the training of the depth estimator neural network is configured to train the classification estimator neural network; subsequently train the distance estimator neural network on the classification estimator without changing the weights or structure of the classification estimator neural network.

In example 167, the subject matter of any one of examples 152 to 156, may optionally include that the velocity estimator is configured as a neural network; and that an output layer of the neural network comprises at least one network portion denoting a velocity estimate.

In example 168, the subject matter of example 167, may optionally include that an input layer of the neural network comprises at least one network portion denoting a classification label, or that an input layer of the neural network comprises at least one network portion denoting a depth estimate.

In example 169, the subject matter of any one of examples 167 or 168, may optionally include that a loss function of the velocity estimator is configured to compute the sum of the differences between the velocity estimates and one velocity reference value.

In example 170, the subject matter of any one of examples 167 to 169, may optionally include that a loss function of the velocity estimator is configured to compute the following formula:

$$\Sigma \|V_i - V_{GT}\|$$

wherein $V_i$ is the velocity estimate extracted from the ith pixel;
$V_{GT}$ is the one velocity reference value;
$\|\ldots\|$ indicates the absolute value function.

In example 171, the subject matter of any one of examples 152 to 156, may optionally include that the odometry estimator is configured as a neural network; and that an output layer of the neural network comprises at least one network portion denoting am odometry estimate.

In example 172, the subject matter of example 171, may optionally include that the odometry estimate includes at least one distance estimate and/or velocity estimate.

In example 173, the subject matter of any one of examples 171 or 172, may optionally include that a loss function of the odometry estimator is configured to compute the average odometry estimate error with respect to the future odometry estimates.

In example 174, the subject matter of any one of examples 171 to 173, may optionally include that a loss function of the velocity estimator is configured to compute the following formula:

$$L_t^{color} = \frac{1}{N} \sum_{x,y}^{N} \|I_t(x,y) - I_{t+1}(x',y')\|$$

wherein $I_t$ is an odometry estimate at time instant t;
$I_{t+1}$ is an odometry estimate at time instant t+1;
N is the number of time instants;
$\|\ldots\|$ indicates the absolute value function.

In example 175, the subject matter of any one of examples 145 to 174, further including: at least one lidar sensor; and/or at least one radar sensor.

In example 176, the subject matter of example 175, may optionally include that the information estimator is further configured to process signals received from the at one lidar sensor and/or from the at least one radar sensor.

In example 177, the subject matter of any one of examples 145 to 176, may optionally include that the particle generator is further configured to determine the particle value adding an error rate to the pixel velocity.

In example 178, the subject matter of example 177, may optionally include that the error rate is normally distributed in accordance with a predefined standard deviation and mean.

In example 179, the subject matter of any one of examples 177 or 178, may optionally include that the mean error rate is 0.

In example 180, the subject matter of any one of examples 145 to 179, may optionally include that the occupancy hypothesis is a dynamic occupancy grid including a plurality of grid cells; that each grid cell represents an area in the predetermined region; that at least one of the grid cells is associated with a single occupancy hypothesis; and that the single occupancy hypothesis comprises an occupancy value, a velocity value, and a classification value.

In example 181, the subject matter of example 180, may optionally include that the occupancy value of the single occupancy hypothesis comprises a likelihood distribution of the occupancy level of the grid cell.

In example 182, the subject matter of examples 180 or 181, may optionally include that the velocity value of the single occupancy hypothesis comprises a likelihood distribution of the velocity of the grid cell.

In example 183, the subject matter of any one of examples 180 to 182, may optionally include that the classification value of the single occupancy hypothesis comprises a likelihood distribution of the classification of the grid cell.

In example 184, the subject matter of any one of examples 180 to 183, may optionally include that the single occupancy hypothesis determiner is configured to determine the single occupancy hypothesis in accordance with the following formula $$m_s^i(\{S,D\}) = m_{s_1}^i(\{S,D\}) \oplus m_{s_2}^i(\{S,D\}) \oplus \ldots \oplus m_{s_n}^i(\{S,D\})$$

wherein $m_{s_n}^i(\{S,D\})$ is the mass belief of the nth sensor;
$\oplus$ is the Dempster Shafer evidence combination operator;
S is an indication that the particles in the cell are static;
D is an indication that the particles in the cell are dynamic.

In example 185, the subject matter of any one of examples 180 to 184, may optionally include that the single occupancy hypothesis determiner is configured to determine the velocity value of sensor information associated to sensors that cannot provide velocity information in accordance with the following formula:

$$p(v_0^i \mid z_0^i) = w_{dyn} * U\left(\begin{pmatrix} -v_{max} \\ -v_{max} \end{pmatrix}, \begin{pmatrix} v_{max} \\ v_{max} \end{pmatrix}\right) + w_{static} * \delta\begin{pmatrix} 0 \\ 0 \end{pmatrix}$$

wherein $$w_{dyn} + w_{static} = 1$$

wherein

U is the uniform distribution;
$\delta$ is the Dirac distribution.

In example 186, the subject matter of any one of examples 145 to 185, may optionally include that the occupancy hypothesis is associated with a time instant.

In example 187, the subject matter of any one of examples 145 to 186, may optionally include that the occupancy hypothesis determiner is further configured to filter particles in the occupancy hypothesis.

In example 188, the subject matter of example 187, may optionally include that the occupancy hypothesis determiner is further configured to filter particles in the occupancy hypothesis using a particle filter.

In example 189, the subject matter of any one of examples 139 or 188, may optionally include that the occupancy hypothesis determiner is further configured to filter the occupancy hypothesis using a Dempster Shafer filter.

In example 190, the subject matter of example 189, may optionally include that the Dempster Shafer filter is based on a Dempster Shafer map.

In example 191, the subject matter of any one of examples 189 or 190, may optionally include that the Dempster Shafer map is based on the Dempster Shafer theory of evidence.

In example 192, the subject matter of any one of examples 189 to 191, may optionally include that the Dempster Shafer map is further configured to transform a first evidence-based dynamic occupancy grid into a second evidence-based dynamic occupancy grid.

Example 193 is a method to train a plurality of neural network, wherein the neural network is composed of a first neural network and a second neural network; wherein a layer of the first neural network is the input layer of the second neural network; comprising: training the first neural network; subsequently training the second neural network on the first neural network without changing the weights or the structure of the first neural network.

In example 194, the subject matter of example 193 may optionally include that training the first neural network comprises backpropagation.

In example 195, the subject matter of examples 193 or 194, may optionally include that the first neural network comprises at least one hidden layer.

In example 196, the subject matter of any one of examples 193 to 195, may optionally include that one of the hidden layers of the first neural network is the input layer of the second neural network.

In example 197, the subject matter of any one of examples 193 to 196, may optionally include that training the first neural network is performed according to backpropagation.

Example 198 is an apparatus to train a neural network so that the neural network is composed of a first neural network and a second neural network; so that a layer of the first neural network may be the input layer of the second neural network; including: a neural network trainer that may train the first neural network; subsequently the neural network trainer may train the second neural network on the first neural network without changing the weights or the structure of the first neural network.

In example 199, the subject matter of example 198 may optionally include that training the first neural network comprises backpropagation.

In example 200, the subject matter of examples 198 or 199, may optionally include that the first neural network comprises at least one hidden layer.

In example 201, the subject matter of any one of examples 198 to 200, may optionally include that one of the hidden layers of the first neural network may be the input layer of the second neural network.

In example 202, the subject matter of any one of examples 198 to 202, may optionally include that training the first neural network is performed according to backpropagation. training the first neural network according to backpropagation.

Example 203 is a non-transient computer readable medium storing a computer program which, when executed by a processor, implements a method to train a plurality of neural network, wherein the neural network is composed of a first neural network and a second neural network; wherein a layer of the first neural network is the input layer of the second neural network; including: training the first neural network subsequently training the second neural network on the first neural network without changing the weights or the structure of the first neural network.

In example 204, the subject matter of example 203, may optionally include that training the first neural network comprises backpropagation.

In example 205 the subject matter of examples 203 or 204, may optionally include that the first neural network comprises at least one hidden layer.

In example 206 the subject matter of any one of examples 203 to 205, may optionally include that one of the hidden layers of the first neural network is the input layer of the second neural network.

In example 207 the subject matter of any one of examples 203 to 207, may optionally include training the first neural network according to backpropagation.

Example 208 is a method to train a neural network to derive odometric estimates from a single image wherein the neural network estimates odometry values of a vehicle, including determining a ground truth odometry value by means of sensors in the vehicle; determining an error of the neural network odometry estimates with respect to the ground truth odometry value; determining the neural network parameters to reduce the error between ground truth odometry value and the neural network estimates.

In example 209 the subject matter of example 208 may optionally include that determining the neural network parameters further comprises backpropagation of the error through the neural network.

In example 210 the subject matter of example 208 may optionally include that sensors in the vehicle further comprises the vehicle's inertial measurement unit.

In example 211 the subject matter of example 208 may optionally include that sensors in the vehicle further comprises the vehicle's visual sensor.

In example 212 the subject matter of example 208 may optionally include that the visual sensor may be a mono-camera.

In example 213 the subject matter of examples 211 or 212 may optionally include that determining a ground truth odometry value by means of sensors in the vehicle further comprises image processing methods applied to the single image or to a plurality of images including the single image.

In example 214 the subject matter of any one of examples 211 to 213 may optionally include that image processing methods further comprise optical flow derivations.

In example 215 the subject matter of any one of examples 211 to 214 may optionally include that image processing methods further comprise motion derivations.

In example 216 the subject matter of any one of examples 211 to 215 may optionally include that image processing methods further comprise deriving a rotation matrix, deriving a translation matrix.

Example 217 is a device to train a neural network to derive odometric estimates from a single image wherein the neural network estimates odometry values of a vehicle, including: a ground truth determiner configured to determine a ground truth odometry value by means of sensors in the vehicle; an error determiner configured to determine an error of the neural network odometry estimates with respect to the ground truth odometry value; a neural network parameters determiner configured to determine the neural network parameters to reduce the error between ground truth odometry value and the neural network estimates.

In example 218 the subject matter of example 217 may optionally include that the neural network parameters determiner is further configured to determine the neural network parameters further comprises backpropagation of the error through the neural network.

In example 219 the subject matter of example 217 may optionally include that sensors in the vehicle further comprises the vehicle's inertial measurement unit.

In example 220 the subject matter of example 217 may optionally include that sensors in the vehicle further comprises the vehicle's visual sensor.

In example 221 the subject matter of example 220 may optionally include that the visual sensor may be a mono-camera.

In example 222 the subject matter of example 220 or 221 may optionally include that ground truth determiner is further configured to determine the ground truth odometry value by means of sensors in the vehicle further comprises image processing mathematical methods applied to the single image or to a plurality of images including the single image.

In example 223 the subject matter of any one of examples 220 to 222 may optionally include that image processing mathematical methods further comprise optical flow derivations.

In example 224 the subject matter of any one of examples 220 to 223 may optionally include image processing mathematical methods further comprise structure from motion derivations.

In example 225 the subject matter of any one of examples 220 to 224 may optionally include that image processing mathematical methods further comprise deriving a rotation matrix; deriving a translation matrix.

Example 226 is a vehicle including a device to train a neural network to derive odometric estimates from a single image wherein the neural network estimates odometry values of a vehicle, including: a ground truth determiner configured to determine a ground truth odometry value by means of sensors in the vehicle; an error determiner configured to determine an error of the neural network odometry estimates with respect to the ground truth odometry value; a neural network parameters determiner configured to determine the neural network parameters to reduce the error between ground truth odometry value and the neural network estimates.

In example 227 the subject matter of example 226 may optionally include that the neural network parameters determiner is further configured to determine the neural network parameters further comprises backpropagation of the error through the neural network.

In example 228 the subject matter of example 226 may optionally include that sensors in the vehicle further comprise the vehicle's inertial measurement unit.

In example 229 the subject matter of example 226 may optionally include that sensors in the vehicle further comprise the vehicle's visual sensor.

In example 230 the subject matter of example 229 may optionally include that the visual sensor may be a mono-camera.

In example 231 the subject matter of example 229 or 230 may optionally include that ground truth determiner is further configured to determine the ground truth odometry value by means of sensors in the vehicle further comprises image processing mathematical methods applied to the single image or to a plurality of images including the single image.

In example 232 the subject matter of any one of examples 229 to 231 may optionally include that image processing mathematical methods further comprise optical flow derivations.

In example 233 the subject matter of any one of examples 229 to 232 may optionally include image processing mathematical methods further comprise structure from motion derivations.

In example 234 the subject matter of any one of examples 229 to 233 may optionally include that image processing mathematical methods further comprise deriving a rotation matrix; deriving a translation matrix.

Example 235 is a non-transient computer readable medium storing a computer program which, when executed by a processor, implements a method to train a neural network to derive odometric estimates from a single image wherein the neural network estimates odometry values of a vehicle, including determining a ground truth odometry value by means of sensors in the vehicle; determining an error of the neural network odometry estimates with respect to the ground truth odometry value; determining the neural network parameters to reduce the error between ground truth odometry value and the neural network estimates.

In example 236 the subject matter of example 235 may optionally include that determining the neural network parameters further comprises backpropagation of the error through the neural network.

In example 237 the subject matter of example 235 may optionally include that sensors in the vehicle further comprises the vehicle's inertial measurement unit.

In example 238 the subject matter of example 235 may optionally include that sensors in the vehicle further comprises the vehicle's visual sensor.

In example 239 the subject matter of example 238 may optionally include that the visual sensor may be a mono-camera.

In example 240 the subject matter of examples 238 or 239 may optionally include that determining a ground truth odometry value by means of sensors in the vehicle further comprises image processing methods applied to the single image or to a plurality of images including the single image.

In example 241 the subject matter of any one of examples 238 to 240 may optionally include that image processing methods further comprise optical flow derivations.

In example 242 the subject matter of any one of examples 238 to 241 may optionally include that image processing methods further comprise motion derivations.

In example 243 the subject matter of any one of examples 238 to 242 may optionally include that image processing methods further comprise deriving a rotation matrix, deriving a translation matrix.

What is claimed is:

1. A perception device, comprising:
   at least one image sensor configured to detect a plurality of images;
   an information estimator configured to estimate from each image of a plurality of images a depth estimate, a velocity estimate, an object classification estimate, and an odometry estimate, wherein estimating the odometry estimate comprises implementing a neural network trained to derive the odometry estimate from the plurality of images by: determining a ground truth odometry value, determining an error of the neural network's estimated odometry values with respect to the ground truth odometry value, and determining neural network parameters to reduce the error between the ground truth odometry value and the neural network's estimated odometry values;
a particle generator configured to generate a plurality of particles, wherein each particle of the plurality of particles comprises a position value determined from the depth estimate, a velocity value determined from the velocity estimate, and a classification value determined from the object classification estimate; and
an occupancy hypothesis determiner configured to determine an occupancy hypothesis of a predetermined region, wherein the occupancy hypothesis is determined based on each particle of the plurality of particles and comprises a dynamic occupancy grid comprising a plurality of grid cells, each grid cell of the plurality of grid cells representing an area in the predetermined region, and wherein at least one of plurality of grid cells is associated with a single occupancy hypothesis based on one or more particles of the plurality of particles in the at least one grid cell.

2. The perception device of claim 1,
wherein the depth estimate is an estimate of a distance from a portion of an object depicted in an image detected by the at least one image sensor to the image sensor;
wherein the velocity estimate is an estimate of a velocity of a portion of an object depicted in an image detected by the at least one image sensor with respect to the at least one image sensor;
wherein the object classification is one or more labels of a predefined set of labels, wherein the one or more labels represent a classification of a portion of an object depicted in an image received by the at least one image sensor;
wherein the odometry estimate is a measure of distance of movement of the at least one image sensor.

3. The perception device of claim 1, wherein the information estimator comprises:
at least one depth estimator configured to estimate the at least one depth estimate from each image of the plurality of images;
at least one velocity estimator configured to estimate the at least one velocity estimate from each image of the plurality of images;
at least one classification estimator configured to estimate the at least one classification estimate from each image of the plurality of images; and
at least one odometry estimator configured to estimate the at least one odometry estimate from each image of the plurality of images.

4. The perception device of claim 3,
wherein at least one of the depth estimator, velocity estimator, classification estimator, or odometry estimator is configured as one or more processors configured to implement a neural network,
wherein an input layer of the neural network comprises a plurality of network portions,
wherein each image of the plurality of images comprises a plurality of pixels, and
wherein each network portion of the plurality of network portions corresponds to at least one pixel of the plurality of pixels.

5. The perception device of claim 1, wherein the at least one image sensor comprises at least one lidar sensor and/or at least one radar sensor,
wherein the information estimator is further configured to process signals received from the at one lidar sensor and/or from the at least one radar sensor.

6. The perception device of claim 1,
wherein the single occupancy hypothesis comprises an occupancy value, a velocity value, and a classification value.

7. The perception device of claim 6,
wherein the occupancy value of the single occupancy hypothesis comprises a likelihood distribution of an occupancy level of the at least one grid cell.

8. The perception device of claim 6,
wherein the velocity value of the single occupancy hypothesis comprises a likelihood distribution of the velocity of the at least one grid cell.

9. The perception device of claim 6,
wherein the classification value of the single occupancy hypothesis comprises a likelihood distribution of a classification of the at least one grid cell.

10. The perception device of claim 1,
wherein the occupancy hypothesis is associated with a time instant.

11. The perception device of claim 1,
wherein the occupancy hypothesis determiner is further configured to filter particles in the occupancy hypothesis.

12. The perception device of claim 1,
wherein the occupancy hypothesis determiner is further configured to filter particles in the occupancy hypothesis using a particle filter.

13. A vehicle comprising:
a perception device, comprising:
at least one image sensor configured to detect a plurality of images;
an information estimator configured to estimate from each image of the plurality of images a depth estimate, a velocity estimate, an object classification estimate and an odometry estimate, wherein estimating the odometry estimate comprises implementing a neural network trained to derive the odometry estimate from the plurality of images by: determining a ground truth odometry value, determining an error of the neural network's estimated odometry values with respect to the ground truth odometry value, and determining neural network parameters to reduce the error between the ground truth odometry value and the neural network's estimated odometry values;
a particle generator configured to generate a plurality of particles, wherein each particle of the plurality of particles comprises a position value determined from the depth estimate, a velocity value determined from the velocity estimate and a classification value determined from the object classification estimate; and
an occupancy hypothesis determiner configured to determine an occupancy hypothesis of a predetermined region, wherein the occupancy hypothesis is determined based on each particle of the plurality of particles and comprises a dynamic occupancy grid comprising a plurality of grid cells, each grid cell of the plurality of grid cells representing an area in the predetermined region, and wherein at least one of plurality of grid cells is associated with a single occupancy hypothesis based on one or more particles of the plurality of particles in the at least one grid cell.

14. The vehicle of claim 13,
wherein the depth estimate is an estimate of a distance from a portion of an object depicted in an image detected by the at least one image sensor to the image sensor;
wherein the velocity estimate is an estimate of a velocity of a portion of an object depicted in an image detected by the at least one image sensor with respect to the at least one image sensor;
wherein the object classification is one or more labels of a predefined set of labels, wherein the one or more labels represent a classification of a portion of an object depicted in an image received by the at least one image sensor; and
wherein the odometry estimate is a measure of distance of movement of the at least one image sensor.

15. The vehicle of claim 13, wherein the information estimator comprises:
at least one depth estimator configured to estimate the at least one depth estimate from each image of the plurality of images;
at least one velocity estimator configured to estimate the at least one velocity estimate from each image of the plurality of images;
at least one classification estimator configured to estimate the at least one classification estimate from each image of the plurality of images; and
at least one odometry estimator configured to estimate the at least one odometry estimate from each image of the plurality of images.

16. The vehicle of claim 13,
wherein at least one of the depth estimator, velocity estimator, classification estimator, or odometry estimator is configured as one or more processors configured to implement a neural network,
wherein an input layer of the neural network comprises a plurality of network portions,
wherein each image of the plurality of images comprises a plurality of pixels,
wherein each network portion of the plurality of network portions corresponds to at least one pixel of the plurality of pixels.

17. One or more non-transitory computer readable media storing a instructions executable by a processor to:
estimate, from each image of a plurality of images, at least one depth estimate, at least one velocity estimate, at least one object classification estimate, and at least one odometry estimate, wherein estimating the odometry estimate comprises implementing a neural network trained to derive the odometry estimate from the plurality of images by: determining a ground truth odometry value, determining an error of the neural network's estimated odometry values with respect to the ground truth odometry value, and determining neural network parameters to reduce the error between the ground truth odometry value and the neural network's estimated odometry values;
generate a plurality of particles, wherein each particle of the plurality of particles comprises a position value determined from the depth estimate, a velocity value determined from the velocity estimate, and a classification value determined from the object classification estimate; and
determine an occupancy hypothesis of a predetermined region, wherein the occupancy hypothesis is determined based on each particle of the plurality of particles and comprises a dynamic occupancy grid comprising a plurality of grid cells, each grid cell of the plurality of grid cells representing an area in the predetermined region, and wherein at least one of plurality of grid cells is associated with a single occupancy hypothesis based on one or more particles of the plurality of particles in the at least one grid cell.

18. The one or more non-transitory computer readable media of claim 17,
wherein the depth estimate is an estimate of a distance from a portion of an object depicted in an image detected by at least one image sensor to the at least one image sensor;
wherein the velocity estimate is an estimate of a velocity of a portion of an object depicted in an image detected by the at least one image sensor with respect to the at least one image sensor;
wherein the object classification is one or more labels of a predefined set of labels, wherein the one or more labels represent a classification of a portion of an object depicted in an image received by the at least one image sensor;
wherein the odometry estimate is a measure of distance of movement of the at least one image sensor.

19. The perception device of claim 1, wherein the single occupancy hypothesis for the at least one grid cell is a dynamic single occupancy hypothesis with a non-zero velocity indicating movement in the at least one grid cell or a static single occupancy hypothesis indicating lack of movement in the other grid cell.

* * * * *